(12) United States Patent
Zhao et al.

(10) Patent No.: US 10,887,365 B2
(45) Date of Patent: Jan. 5, 2021

(54) SYSTEM AND METHODS FOR BIT RATE CONTROL

(71) Applicant: SZ DJI TECHNOLOGY CO., LTD., Shenzhen (CN)

(72) Inventors: Wenjun Zhao, Shenzhen (CN); Yannan Wu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 45 days.

(21) Appl. No.: 16/262,048

(22) Filed: Jan. 30, 2019

(65) Prior Publication Data
US 2019/0166180 A1    May 30, 2019

Related U.S. Application Data

(63) Continuation of application No. PCT/CN2016/093280, filed on Aug. 4, 2016.

(51) Int. Cl.
*H04L 29/06* (2006.01)
*H04N 19/15* (2014.01)
(Continued)

(52) U.S. Cl.
CPC ........ *H04L 65/607* (2013.01); *H04L 65/4092* (2013.01); *H04L 65/601* (2013.01);
(Continued)

(58) Field of Classification Search
CPC . H04L 65/4092; H04L 65/601; H04L 65/607; H04N 19/126; H04N 19/15; H04N 19/174
See application file for complete search history.

(56) References Cited

U.S. PATENT DOCUMENTS 8,527,649 B2 * 9/2013 Wexler ............... H04L 65/4076
709/203
8,681,873 B2 * 3/2014 Bivolarsky .......... H04N 19/119
375/240.21
(Continued)

FOREIGN PATENT DOCUMENTS

CN 101159867 A 4/2008
CN 101217615 A 7/2008

OTHER PUBLICATIONS

The World Intellectual Property Organization (WIPO) The International Search Report and Written Opinion for PCT/CN2016/093280 dated May 10, 2017 7 pages.

*Primary Examiner* — Thomas J Dailey
(74) *Attorney, Agent, or Firm* — Anova Law Group, PLLC

(57) ABSTRACT

A computer-implemented method for controlling bit rate includes determining a difference between a cumulative number of bits used to encode one or more slices of a frame up to and including a first slice encoded using a first coding parameter and a maximum number of bits allowed to encode the one or more slices of the frame, updating a coding parameter threshold based at least in part on a counter that indicates a number of times when one or more coding parameters used to encode the one or more slices reach or exceed the coding parameter threshold, and determining a second coding parameter used to encode a second slice of the frame based at least in part on the difference and the updated coding parameter threshold.

21 Claims, 10 Drawing Sheets

(51) Int. Cl.
*H04N 19/174* (2014.01)
*H04N 19/126* (2014.01)

(52) U.S. Cl.
CPC ........... *H04N 19/126* (2014.11); *H04N 19/15* (2014.11); *H04N 19/174* (2014.11)

(56) References Cited

U.S. PATENT DOCUMENTS

| | | | |
|---|---|---|---|
| 8,879,635 B2* | 11/2014 | Raveendran | H04N 5/144 375/240.24 |
| 9,313,526 B2* | 4/2016 | Bivolarsky | H04N 19/105 |
| 9,445,114 B2* | 9/2016 | Ouedraogo | H04N 19/70 |
| 9,986,008 B2* | 5/2018 | Ramamurthy | H04N 21/234354 |
| 2007/0127566 A1* | 6/2007 | Schoenblum | H04N 19/48 375/240.03 |
| 2008/0013624 A1* | 1/2008 | Han | H04N 19/61 375/240.1 |
| 2008/0165036 A1 | 7/2008 | Shima | |
| 2013/0114693 A1 | 5/2013 | Gao et al. | |
| 2013/0114698 A1 | 5/2013 | Lou et al. | |
| 2015/0319441 A1* | 11/2015 | Puri | H04N 19/14 375/240.02 |
| 2016/0301931 A1* | 10/2016 | Wen | H04N 19/124 |
| 2018/0027244 A1* | 1/2018 | Chen | H04N 19/124 375/240.03 |

\* cited by examiner

SYSTEM AND METHODS FOR BIT RATE CONTROL

CROSS-REFERENCE TO RELATED APPLICATION

This application is a continuation of International Application No. PCT/CN2016/093280, filed on Aug. 4, 2016, the entire content of which is incorporated herein by reference.

BACKGROUND OF THE DISCLOSURE

Streaming of video and other media content has become increasingly popular in recent years. Typically, the video data or other media content is encoded (e.g., compressed) at the source into an encoded (e.g., compressed) bit stream, which is then transmitted to a receiver over a communication channel. The number of bits used to encode a unit of data (e.g., a frame of video) per unit of time (e.g., second) is referred to as the bit rate. A higher bit rate is typically means higher playback quality (e.g., visual quality) the encoded bit stream. It is important, however, to control the bit rate of encoded bit streams in order to ensure that various constraints of the sender, the receiver, and/or the communication channel are met. For instance, it may be desirable to keep the bit rate of the encoded video frames below a certain maximum bit rate so as to prevent buffer overflow or to accommodate a bandwidth limitation.

SUMMARY OF THE DISCLOSURE

According to some embodiments, a computer-implemented method is provided for controlling bit rate. The method comprises determining a difference between a cumulative number of bits used to encode one or more slices of a frame up to and including a first slice and a maximum number of bits allowed to encode the one or more slices of the frame, the first slice being encoded using a first coding parameter, updating a coding parameter threshold based at least in part on a counter that indicates a number of times when one or more coding parameters used to encode the one or more slices reach or exceed the coding parameter threshold, and determining a second coding parameter used to encode a second slice of the frame based at least in part on the difference and the updated coding parameter threshold.

According to some embodiments, one or more non-transitory computer-readable storage media is provided. The storage media stores computer-executable instructions that, when executed by a computing system, configure the computing system to perform operations comprising determining a difference between a cumulative number of bits used to encode one or more slices of a frame up to and including a first slice and a maximum number of bits allowed to encode the one or more slices of the frame, the first slice being encoded using a first coding parameter, updating a coding parameter threshold based at least in part on a counter that indicates a number of times when one or more coding parameters used to encode the one or more slices reach or exceed the coding parameter threshold, and determining a second coding parameter used to encode a second slice of the frame based at least in part on the difference and the updated coding parameter threshold.

According to some embodiments, a computer system is provided. The computer system comprises a memory that stores one or more computer-executable instructions and one or more processors configured to access the memory and execute the computer-executable instructions to perform steps comprising determining a difference between a cumulative number of bits used to encode one or more slices of a frame up to and including a first slice and a maximum number of bits allowed to encode the one or more slices of the frame, the first slice being encoded using a first coding parameter, updating a coding parameter threshold based at least in part on a counter that indicates a number of times when one or more coding parameters used to encode the one or more slices reach or exceed the coding parameter threshold; and determining a second coding parameter used to encode a second slice of the frame based at least in part on the difference and the updated coding parameter threshold.

According to some embodiments, a computer-implemented method is provided for controlling bit rate. The method comprises determining an expected adjustment to a first coding parameter for a first slice based on a difference between a cumulative number of bits used to encode slices up to and including the first slice and a maximum number of bits allowed to encode the slices, determining an indicator that indicates a relationship between a coding parameter threshold and coding parameters used to encode the slices, updating a coding parameter threshold based at least in part on the indicator, determining an actual adjustment to the first coding parameter based at least in part on the updated coding parameter threshold and the expected adjustment; and applying the actual adjustment to the first coding parameter to determine a second coding parameter used to encode a second slice.

It shall be understood that different aspects of the disclosure can be appreciated individually, collectively, or in combination with each other. Various aspects of the disclosure described herein may be applied to any of the particular applications set forth below or data communication between any other types of movable and/or stationary objects.

Other objects and features of the present disclosure will become apparent by a review of the specification, claims, and appended figures.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE EMBODIMENTS

The systems, devices, and methods of the present disclosure provide techniques for controlling bit rate of encoded video or other types of data. In particular, the techniques can be used to keep the bit rate per frame around or below a given maximum bit size or bit rate by adjusting coding parameters after encoding each slice of a frame. For example, if the encoding of a slice causes the cumulative bit size to exceed the maximum cumulative bit size allocated, then the coding parameters for the next slice is adjusted correspondingly to reduce the number of bits used to encode the next slice; and vice versa. Such coding parameters may include, for example, a quantization index used to quantize the next slice and a cutoff index used to remove certain high frequency coefficients of the next slice. Advantageously, the described techniques can be used to achieve rate control of the input data in a single pass, without preprocessing the input data, thereby saving the time and computing resources required for the encoding process. The coding parameters and the bit rate may be adjusted in a gradual fashion, without significantly affecting the quality of the reconstructed data. In addition, the coding parameters may be adjusted adaptively based on an encoding order of the slices.

Figure 1:
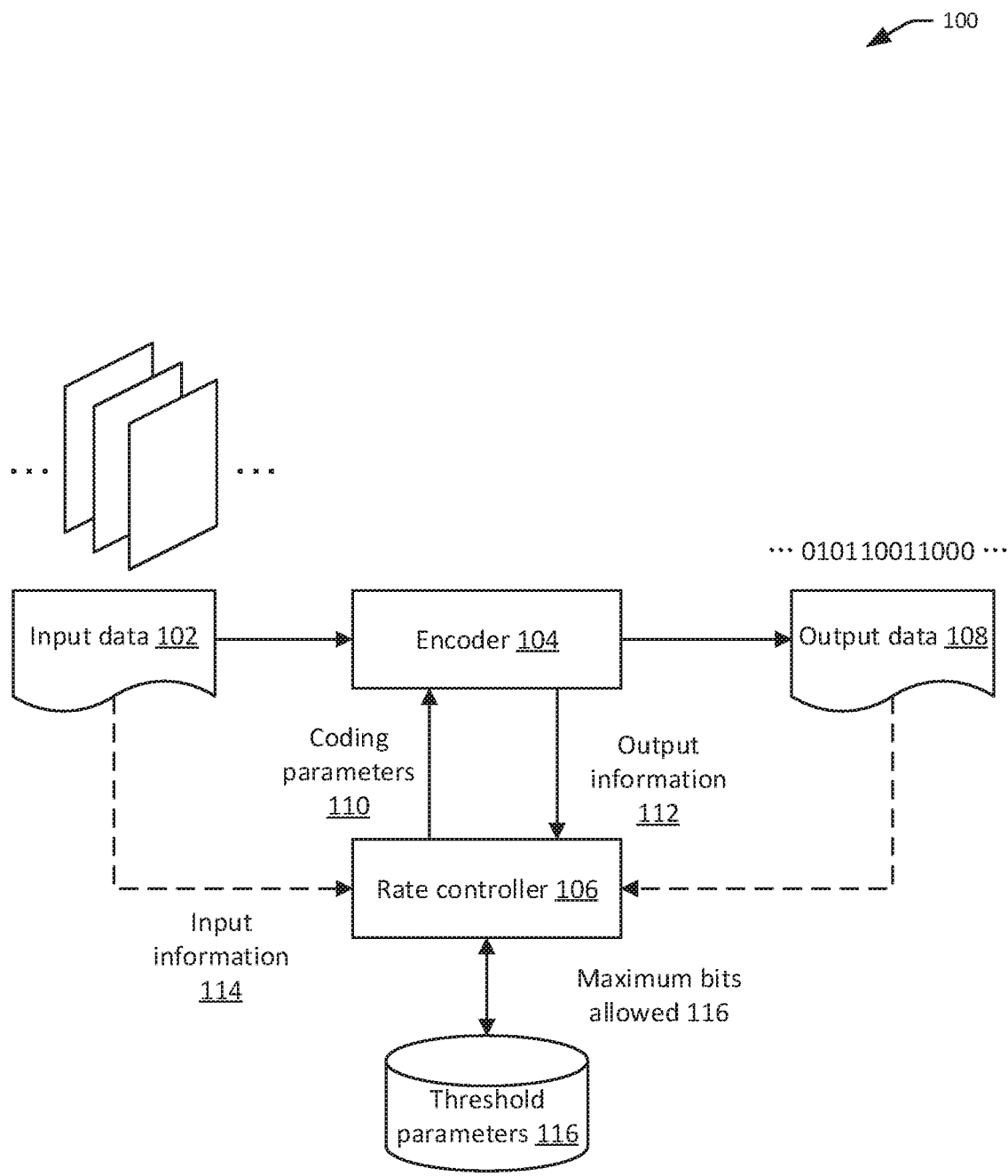
FIG. 1 illustrates an exemplary system for implementing rate control, in accordance with embodiments.

FIG. 1 illustrates an exemplary system 100 for implementing rate control, in accordance with embodiments. The system 100 can be configured to receive and encode input data 102 to produce output data 108. For instance, the system 100 may be configured to receive videos as input data, compress the video data to produce one or more compressed bit streams as output data. During data encoding, the system 100 may be configured to control the bit size (and hence bit rate) of the encoded data using the techniques described herein. In various embodiments, components of the system 100 may be implemented by one or more processors in a computing device (e.g., desktops, laptops, tablets, smartphones, setup boxes) or onboard a movable object such as an unmanned aerial vehicle (UAV). The one or more processors can include ARM processors, field-programmable gate arrays (FPGAs), central processing units (CPUs), graphics processing units (GPUs), and the like. In some embodiments, the components of the system 100 may be implemented using hardware acceleration techniques.

The system 100 comprises an encoder 104 and a rate controller 106. The encoder 104 and the rate controller 106 may be implemented by the same or different computing devices. In some embodiments, the rate controller 106 may form an integral part of the encoder 104; or vice versa. The encoder 104 is configured to receive input data 102, encode the input data 102, and provide output data 108 comprising the encoded input data. The input data can include text, images, graphic objects, animation sequences, audio recordings, videos, or any other data that needs to be encoded. In some cases, the input data may include sensing data from one or more sensors such as vision sensors (e.g., cameras, infrared sensors), microphones, proximity sensors (e.g., ultrasound, lidar), position sensors, temperature sensors, touch sensors, and the like. In some cases, the input data may include input from a user such as biometric information including facial features, fingerprint scan, retina scan, voice recording, DNA samples, and the like.

Encoding of the input data may be necessary for efficient and/or secure transmission or storage of the data. Encoding of the input data can involve data compression, encryption, error encoding, format conversion, and the like. For example, multimedia data such as video or audio may be compressed to reduce the number of bits that are transmitted over the network. Sensitive data such as financial information and personally identifying information may be encrypted before being transmitted or stored to protect confidentiality and/or privacy.

Any suitable encoding techniques may be used to encode input data. The type of encoding applied may depending on the data to be encoded and specific encoding requirements. For example, lossy compression techniques (e.g., transform coding) may be used to encode multimedia data such as audio signals and image data (e.g., still images or video); whereas lossless compression techniques may be used to encode text and binary data (e.g., executable files). Audio signals may be compressed using audio compression methods and video data may be compressed using video compression methods. In some cases, the encoding of certain input data (e.g., financial data, medical or personal information) may be governed by established laws, regulations, or standards. Furthermore, available computing resources (e.g., CPU, memory, buffer capacity) and/or network environment (e.g., bandwidth, security) may affect the type of encoding that is performed. For instance, a server computer equipped with powerful CPUs may be configured to implement a relatively complex encoding algorithm, whereas a mobile device with limited computing resources may be configured to implement a relatively simple encoding algorithm. As another example, if the encoded data will be transmitted in a relatively secure environment (e.g., over a private or firewall-protected network), then the input date may be encrypted with an encryption algorithm that has a relatively low security level. On the other hand, if the encoded data will be transmitted in a less secure environment (e.g., over the Internet), then the input data may be encrypted with an encryption algorithm that has a relatively high security level.

In some embodiments, the encoder 104 may implement one or more different codecs. Each of the one or more codes may comprise codes, instructions or computer programs that implement different encoding algorithms. A suitable codec may be selected to encode a given set of input data based on various factors such as discussed above, including the types and/or sources of input data, the receiving entities of the encoded data, availability of computing resources, network environment, business requirements, regulations and standards, and the like.

In an example, an encoder may be configured to encode a series of video frames. Data in each frame may be encoded using a series of steps. The encoding may be based entirely on spatial information contained within a frame (e.g., an intra frame or I frame). In such embodiments, the encoding steps may include a transform step, a quantization step, and an entropy encoding step. During the transform step, the raw input data is transformed to a different domain (e.g., spatial frequency domain) suitable for the data content of the input data (e.g., video). Any suitable transform coding techniques may be used including Fourier-type transforms such as discrete cosine transform (DCT) or modified DCT. Using DCT as an example, a DCT matrix is determined based on a size of the data unit. The data unit may include a block of 4×4 or 8×8 pixels, a macroblock of 16×16 pixels, or any suitable set of data. The DCT matrix is then applied to the data unit using matrix multiplication, yielding a transformed matrix comprising transform coefficients.

In the quantization step, the coefficients in the transformed matrix may be quantized, for example, by dividing each coefficient by a corresponding element in a quantization matrix, and then rounding to the nearest integer value. The quantization matrix may be derived using a quantization parameter (also referred to as a quantization index). For example, the quantization parameter may be the value for each element of the quantization matrix. As another example, some or all of the elements in the quantization matrix may be multiplied (scaled) by the quantization parameter and the scaled quantization matrix may be used to quantize the transformed matrix. The quantization parameter may be an integer within a certain range (e.g., between and including 0 and 128). Typically, the higher the value of the quantization parameter, the larger the quantization step size is and the larger the element values are in the quantization matrix. This causes more transform coefficients to be quantized to zero or near-zero and less, which means that less bits would be required to encode the quantized coefficients. The more zero or near-zero coefficients there are, the less bits are required to encode the coefficients, resulting in lower bit size (and hence lower bit rate) for the data unit represented by the coefficients. The opposite is also true, that is, a lower value of a quantization parameter corresponds to a smaller quantization step size, a greater number of bits required to encode the quantized coefficients, and a higher bit size (and hence higher bit rate) for the data unit encoded using the quantization parameter. Techniques are provided herein for controlling the bit rate of the encoded input data by varying the quantization parameters used to encode portions of the input data.

In the entropy encoding step, the quantized coefficients in a quantized matrix are scanned in a predetermined order and encoded using any suitable coding technique. Since most of the non-zero DCT coefficients are likely concentrated in the upper left-hand corner of the matrix, a zigzag scanning pattern from the upper left to the lower right is typical. Alternative scanning order such as a raster scan may be used. The scanning order may be used to maximize the probability of achieving long runs of consecutive zero coefficients. The scanned coefficients can then be encoded using run-length encoding, variable-length encoding, or any other entropy encoding techniques, to generate the output data 108.

The above-described encoding process can be used to encode intra frames (I frames) based primary on spatial information contained within the intra frames. Additionally or alternatively, the encoder 104 may be configured to exploit temporal redundancy between the frames and encode inter frames (e.g., P frames or B frames) based on forward and/or backward predictions made from previous or subsequent frames. In such embodiments, the encoding steps may include a prediction step, a transform step, a quantization step, and an entropy encoding step. In the prediction step, a frame may be forward and/or backward predicted based on a previous frame and/or a subsequent frame by estimating motion of the camera and/or objects in the video. Any suitable motion estimation techniques may be used to determine the motion vectors between adjacent frames, including pixel based methods (e.g., block-matching) and feather based methods (e.g., corner detection). If an acceptable match of a corresponding data unit (e.g., macroblock) is not found, then the encoder may encode the data unit as an intra data unit, as described above. Otherwise, the predicted frame may be subtracted from its reference and the residual error frame may be generated. The data included in the residual error frame may be spatially encoded in a similar fashion as for an intra frame, as described above. For example, one or more data matrices of the residual error frame may be transformed (e.g., using DCT) and quantized. The quantized transform coefficients of the residual error frame, the motion vectors or the difference between motion vectors of adjacent frames, along with any other suitable data needed to reconstruct the frame may be entropy encoded. As in intra encoding, the bit rate of the encoded data may be controlled at least in part by a quantization parameter provided by a rate controller.

Still referring to FIG. 1, the rate controller 106 may be configured to control the bit rate of the output data by providing the encoder 104 with one or more coding parameters 110 (also referred to as rate control parameters). The bit rate may be controlled to be within a certain range (e.g., below a maximum bit rate, above a minimum bit rate) or close to a target average bit rate. Alternatively, the bit rate may be controlled to vary depending on the complexity of the frames, bandwidth limit, buffer capacity, and other factors. In some cases, rate control may be enforced at one or more levels such as groups of pictures (GOP) level, frame level, slice level, macroblock level, block level, pixel level, and the like.

The coding parameters can include one or more quantization parameters for controlling the quantization step of the encoding process and hence the bit rate of the resulting output data. The quantization parameters may include, for example, a quantization step size, a value indicative of or related to a quantization step size such as a QP used in H.264 or similar encoders, a quantization matrix or a reference thereof, and the like. The coding parameters may include parameters for controlling other aspects of the encoding process such as the prediction step, the transform step, and/or the entropy encoding step. For instance, coding parameters may include a cutoff index used for removing certain high frequency coefficients before the coefficients are entropy encoded. Other examples of the coding parameters may include bit allocation information (e.g., maximum, minimum, or target bits allocated for encoding a data unit), a frame rate, a size of a data unit to be transformed and quantized, motion detection thresholds used to determine whether to code or skip coding a data unit (e.g., macroblock), Lagrange multiplier used in rate distortion optimization, algorithms and parameters used for the prediction, transform, and/or entropy encoding steps, and the like.

The rate controller 106 may be configured to control rate (e.g., by providing the code parameters 110) based at least in part on output information 112 about the output data 108 and/or the encoder 104. The output information may be provided by the encoder 104 or optionally derived by the rate controller based on the output data 108. The output information may include, for example, a number of bits used to encode a data unit (e.g., a frame, a slice, a macroblock), parameters (including algorithms) used to encode the data unit, encoder resource information (e.g., CPU/memory usage, buffer usage), and the like. Such information may be used by the rate controller to adjust one or more coding parameters (e.g., a quantization parameter) for one or more subsequent data units.

The rate controller 106 may optionally be configured to control rate based at least in part on input information 114 about the input data 108. Input information may include any characteristics of the input data that may be used for rate control, such as resolution, size, image complexity, texture, luminance, chrominance, motion information, and the like. For example, highly complex input data may be encoded with a higher bit rate than less complex input data.

In some embodiments, the rate controller 106 may be configured to control rate based on one or more rate control threshold parameters 116. The values of the threshold parameters may be predefined and/or dynamically updated by a user, a system administrator, the rate controller 106, or any other component or device. The rate control threshold parameters may be used to derive coding parameters 110. In some embodiments, the threshold values used to determine to the coding parameters for encoding a given slice may vary depending on an encoding order of the slice relative to other slices of a frame. Exemplary threshold parameters are discussed in more details in FIGS. 6-7.

In some embodiments, the rate controller 106 may be configured to control rate based on additional information. Such information may include decoder information from an entity configured to receive, decode, and/or playback or display the output data 108 (e.g., decoder buffer usage, delay, noise, playback quality), current computing environment (e.g., network bandwidth, workload), user instructions, or any other suitable information relevant to rate control.

The output data 108 may be stored at a local or remote data store and/or provided to a local or remote decoder. The output data 108 may be transmitted over a communication channel. Exemplary communication channels include wired or wireless networks such as the Internet, storage area network (SAN), local area networks (LAN), wide area networks (WAN), point-to-point (P2P) networks, Wifi network, radio communication, and the like.

A decoder may be configured to perform decoding steps that are the inverse of the encoding steps of the encoder in order to generate reconstructed data. The reconstructed data may then be displayed or played back. For example, to decode intra encoded data (e.g., I frames), the decoding steps include an entropy decoding step (e.g., using variable length decoding), an inverse quantization step, and an inverse transform step (e.g., using Inverse Discrete Cosine Transform (IDCT)) that perform the inverse of the corresponding entropy encoding, quantization, and transform steps of the encoder. To decode inter encoded data (e.g., B frames or P frames), the decoding process can include additional motion compensation support.

Figure 2:
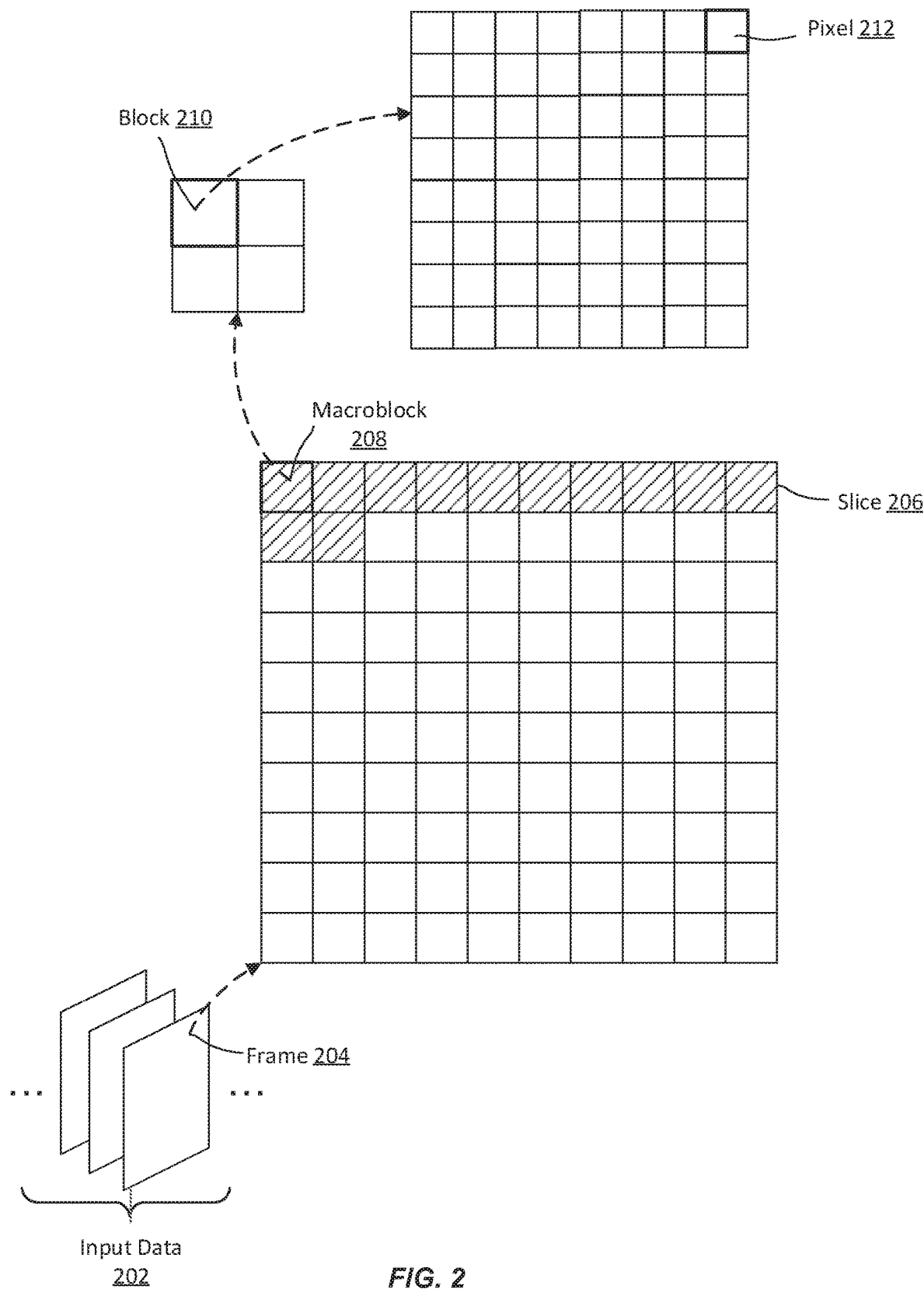
FIG. 2 illustrates exemplary data units for input data to be encoded, in accordance with embodiments.

FIG. 2 illustrates exemplary data units for input data to be encoded, in accordance with embodiments. As illustrated, the input data 202 can comprise a plurality of frames 204. The frames 204 may represent consecutive image frames in a video stream, for example. Each frame 204 may comprise one or more slices 206. Each slice 206 may comprise one or more macroblocks 208. Each macroblock 208 may comprise one or more blocks 210. Each block 210 may comprise one or more pixels 212. Each pixel 212 may comprise one or more sets of data corresponding to one or more data components such as luminance data component and chrominance data component. A data unit refers can refer to a frame, a slice, a macroblock, a blocks, a pixel, or a group of any of the above. The sizes (e.g., pixel counts, dimension) of the data units may vary in different embodiments. For instance, in an example, a frame 204 may comprise 100 slices 206, each slice 206 comprising 10 macroblocks 208, each macroblock 208 comprising four (e.g., 2×2) blocks 210, each block 210 comprising 64 (e.g., 8×8) pixels 212.

The following discussion focus on the encoding of input data comprising single value pixel data. However, it is understood that the techniques discussed herein can be extended to input data where each pixel is represented by multiple data values corresponding to multiple components, such as color space channels. For instance, a block of image data may be represented by multiple blocks of the same size, each block comprising pixel data related to a particular component or channel of a color space associated with the image data. Thus, an 8×8 block of YCbCr encoded image data may be represented by an 8×8 block of Y (luma) data and two 8×8 blocks of chrominance data corresponding to Cb and Cr channels. The encoding steps discussed herein can be applied to each of the luma and chrominance data blocks in order to encode the entire input data.

In various embodiments, the encoding steps discussed herein can be applied to any suitable data level or levels. Applying an encoding step at a certain a data level means that an entire data unit at the given data level is encoded as a whole before the encoding step is applied to the next data unit. The encoding steps may be applied at the same data level. For instance, the transform step and/or quantization step can be applied at a block level (e.g., to 8×8 pixel blocks), a macroblock level (e.g., to 16×16 pixel macroblocks), or at a slice level. Alternatively, different encoding steps may be performed at different data levels. For instance, the transform step may be performed at the macroblock level, the quantization step may be performed at the slice level, and the entropy encoding step may be performed at the frame level. In such an example, all the macroblocks within a given slice would be transformed one by one before the entire transformed slice is quantized, and all the slices within a frame are quantized before the quantized coefficients are entropy encoded.

Similarly, the rate control parameters may be applicable to any suitable data level or levels. For example, a single quantization parameter may be used for the quantization of a block, a macroblock, or a slice. In some embodiments, different rate control parameters may be associated with different encoding operations, which may be applied to different data levels. For example, a motion detection threshold may be used for motion detection of macroblocks, a quantization parameter may be used for quantization of slices, and another rate control parameter may be used during entropy encoding of an entire frame.

Figure 3:
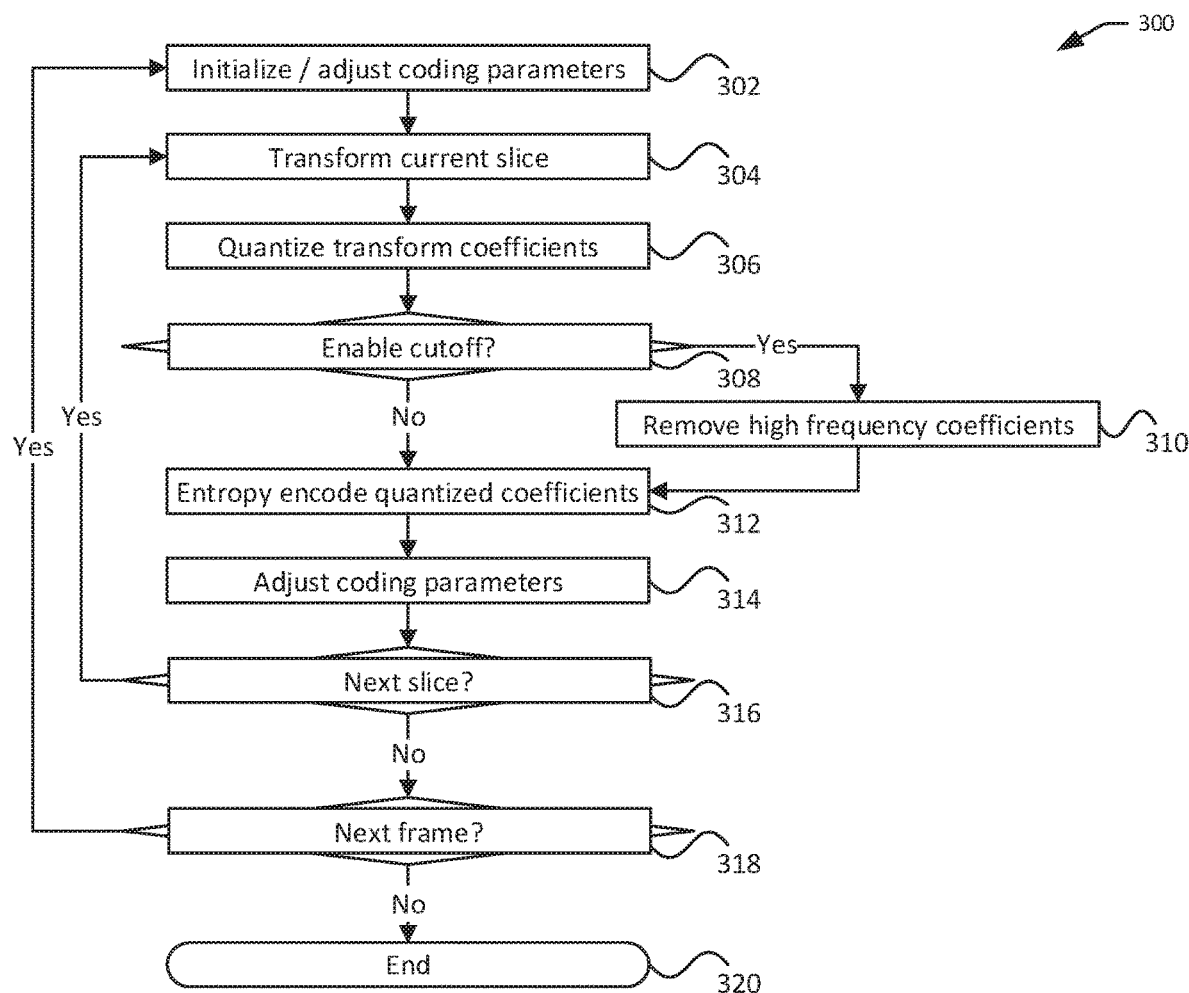
FIG. 3 illustrates an example process for encoding data with rate control, in accordance with embodiments.

FIG. 3 illustrates an example process 300 for encoding data with rate control, in accordance with embodiments. The process 300 may be performed by the system 100 discussed in FIG. 1. The data to be encoded can comprise a plurality of frames, each frame comprising a plurality of slices, such as discussed in FIG. 2. Before, during and/or after the encoding of the slices, the coding parameters may be initialized or updated so as to implement bit rate control. While the rate control is applied primarily at the slice level in the following discussion, it is understood that the rate control techniques discussed herein can be applied at any suitable level of data units such as macroblocks, blocks, frames, and the like.

Some or all aspects of the process 300 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

At block 302, one or more coding parameters used for encoding the input data are initialized or adjusted. Some or all of the coding parameters may be used for rate control. In some embodiments, the coding parameters may be provided by a rate controller such as the rate controller 106 or otherwise calculated based on configuration data such as that stored in the database 116 discussed in FIG. 1. The coding parameters can include global constants that are initialized once before the encoding process and may remain unchanged throughout the encoding of the entire input data, such as a target bit size, a maximum bit size, and/or a minimum bit size per frame, slice, or macroblock, or block (e.g., for macroblock, targetSizePerMb, maxSizePerMb, or minSizePerMb). In some embodiments, given a maximum bit size per frame, the maximum bit size per macroblocks may be calculated by dividing the maximum bit size per frame by the total number of macroblocks in a frame. The number of maximum bit size per slice may be calculated by multiplying the maximum bit size per macroblock with the number of macroblocks in a slice.

The coding parameters may also include global variables (e.g., thresholds) that can be updated before or after the encoding of each frame in order to control bit rate. Examples of such parameters can include a minimum quantization index (minQIdx), maximum quantization index (maxQIdx), initial quantization index (initialQIdx), average of previous quantization indices (e.g., prevAveQIdx), cutoff index or indices (e.g., cutoff_IdxL, cutoff_IdxC) for removing high frequency coefficients, a threshold (e.g., maxQIdxReachedNum) of a counter that indicates a relationship between one or more coding parameters and one or more coding parameter thresholds, a maximum quantization parameter (maxQIdx) or a minimum quantization parameter (minQIdx), and the like.

One or more cutoff indices may be used depending on the representation of input data. In a single component representation, each pixel may be represented by a single value for the single component. Only one cutoff index may be needed. In a multiple component representation, each pixel may be represented by multiple values corresponding to multiple components (e.g., luma and chroma components). Here, multiple cutoff indices may be provided for encoding the multiple component values. For example, cutoff_idxL may represent the cutoff index luma coefficients and cutoff_idxC may represent the cutoff index for chroma (e.g., Cb, Cr) coefficients.

The indicator that indicates a relationship between one or more coding parameters and one or more coding parameter thresholds. The indicator can include a numMaxQIdxReached counter that tracks the number of times quantization indices used for quantization of one or more slices reach or exceed a given maximum quantization index (maxQIdx). In some embodiments, when the numMaxQIdxReached reaches or exceeds a given threshold, maxQIdReachedNum then the bit rate for subsequent data may be reduced (e.g., by reducing the quantization index for the next data unit); and vice versa. Thus, the threshold maxQIdReachedNum may be incremented or decremented to increase or decrease the bit rate, respectively. The cutoff indices may be increased or decreased to increase or decrease the bit rate, respectively.

In some embodiments, the coding parameters may be initialized or updated differently for different types of frames (e.g., inter or intra frames), or depending on an order of the current frame to be encoded relative to the other frames in the input data. For example, if the current frame to be encoded is the very first frame of the input data, then the initial quantization index (initialQIdx), the maxQIdxReachedNum threshold, and the cutoff indices may be initialized to the following predefined values:

initialQIdx=DEFAULT_QIDX[profileIdx]
maxQIdxReachedNum=10
cutoff_idxL=55
cutoff_idxC=55

In the equations, initialQIdx is set to an element of an array of default initial quantization indices, DEFAULT_QIDX, the element selected using a profile index (profileIdx) associated with a different type of input data, encoder, and/or specification. The values assigned to maxQIdxReachedNum, cutoff_idxL, and cutoff_idxC are provided for illustrative purposes only and may be different values in other embodiments.

If the current frame is not the first frame of the input data, then the coding parameters may be updated based at least in part on the encoding of previous frames. For example, the initial quantization index (initialQIdx) may be the average value of previous quantization indices. If bit size used to encode the previous frame exceeds the maximum bit size per frame (e.g., indicating a buffer overflow), then bit rate for the subsequent data may be reduced by reducing the threshold maxQIdxReachedNum for the numQIdxReached counter, and the cutoff indices as follows:

maxQIdxReachedNum-=2
cutoff_idxL-=5
cutoff_idxC-=5

In other words, maxQIdxReachedNum is decremented by 2, cutoff_idxL is decremented by 5, and cutoff_idxC is decremented by 5. The values for the decrements above are provided for illustrative purposes only. In various embodiments, any suitable positive values may be used. If the bit size used to encode the previous frame does not exceed the maximum bit size per frame (e.g., no buffer overflow), then the coding parameters may be kept the same as for the previous frame.

In some embodiments, a maximum quantization parameter (maxQIdx) or a minimum quantization parameter (minQIdx) may be initialized or updated in block 302. For instance, the maxQIdx may be assigned the value of initialQIdx discussed above.

Once the coding parameters are set, the process 300 may comprise encoding each slice of the current frame in blocks 304-312, in which the coding parameters that are configured in block 302 may be used and/or updated to control bit rate. At block 304, the current slice is transformed (e.g., to a spatial frequency domain), for example, using a Fourier-type transform such as DCT or modified DCT. In an embodiment, each 8×8 block of each macroblock of the current slice is transformed. An 8×8 DCT matrix may be applied to each 8×8 block to yield a transform matrix comprising 64 transform coefficients for the 64 pixels of the 8×8 block. If a slice comprises 8 macroblocks and each macroblocks comprises 4 8×8 blocks, then 8×8 DCT matrix is applied to each of the 32 8×8 blocks to yield 64×32=2048 transform coefficients.

At block 306, the transform coefficients of the current slice are quantized. Quantization can include dividing each coefficient of a transformed block matrix (e.g., for an 8×8 block) by a corresponding element in a quantization matrix of the same dimension (e.g., an 8×8 quantization matrix), and then rounding to the nearest integer value. Quantizing a slice can include quantizing each block transform matrix of each macroblock of the slice. Aspects of the quantization in block 306 may be performed according to one or more coding parameters initialized or updated in block 302 and/or block 314 (discussed below). For instance, the quantization matrix may be derived using a quantization index (qIdx, also referred to as a quantization parameter). In some embodiments, the quantization index may represent an element value of the quantization matrix. In some other embodiments, the quantization index may represent a scalar used to calculate or derive elements of a quantization matrix used to quantize the transformed block matrix. With higher the quantization index, the more coefficients are likely quantized to or near zero, resulting in a lower bit size and hence a lower bit rate. On the other hand, lower quantization index can be used to increase the bit rate. By varying the quantization indices, the bit rate across different slices can be kept below or close to a predetermined maximum bit rate or at or near a target bit rate.

In some embodiments, the quantization index can be determined based on an order of the current slice relative to the other slices in a frame. For instance, if the current slice is the first slice of the frame, then the quantization index may be assigned an initial quantization index (initialQIdx) such as set above in block 302. If the current slice is not the first slice in the frame, then the quantization index for the current slice may be determined by adjusting a previous quantization index used for the encoding of a previous slice of the frame, such as done in block 314, after the encoding of the previous slice and before the encoding of the current slice.

At block 308, it is determined whether remove certain high frequency coefficients. As used herein, cutting off or removing a coefficient means replacing the coefficient with zero or otherwise marking the coefficient as zero such that it is not entropy encoded. Cutting off or removing coefficients reduce the amount of information that need to be encoded and therefore reduces the number of bits (bit size) required to encode the information. Since human eyes are less sensitive to high frequencies (and hence to errors in high frequency coefficients) than to low frequencies (and hence to errors in low frequency coefficients), the higher frequency coefficients can be more coarsely quantized or cut off than the lower frequency coefficients to reduce the bit rate without significantly affecting the quality of the reconstructed data (e.g., as indicated by peak signal-to-noise ratio (PSNR)). Accordingly, the removing high frequency coefficients can be used as another method for controlling bit rate besides using quantization index.

The removal of the high frequency coefficients may be performed according to one or more cutoff-related coding parameters. The cutoff-related parameters may indicate whether to cut off high frequency coefficients for a current slice and which coefficients to cut off. For example, a cutoff indicator enCutoff may indicate whether to enable high frequency coefficients cutoff for the current slice. The cutoff-related parameters may also include one or more cutoff indices (e.g., cutoff_idxL or cutoff_idxC). A cutoff index may indicate an index such that coefficients having an index greater or equal to the cutoff index will be removed. For a given transform/quantization unit (e.g., an 8×8 block), the coefficients of each pixel of the unit may be indexed according to its frequency such that if a higher frequency coefficient has a higher index than a lower frequency coefficient. Thus, an 8×8 block may have 64 coefficients, where the lowest frequency coefficient has an index 0 and the highest frequency coefficient has an index 63. If the cutoff index is 60, then in an example, coefficients with an index greater than 60 (e.g., 61, 62, or 63) are removed. In another example, the cutoff index may be inclusive such that coefficients having the same index as the cutoff index (e.g., 60) are also removed.

The cutoff-related parameters may be initialized or updated in block 302 or block 314, for example, by a rate controller such as discussed in FIG. 1. The values of the cutoff-related parameters may vary depending on an order of the current slice and/or the current frame. For example, as discussed in block 302, the cutoff-related parameters may be set to different values depending on whether the current frame is the first frame. In some cases, the cutoff-related parameters may be dynamically adjusted for the next slice or frame depending on the encoding of the current slice or frame. For example, as discussed in block 302, if the bit size of the encoded current frame exceeds a maximum bit size allocated for the frame, then the cutoff-related parameters may be adjusted accordingly to reduce the bit rate for the next frame, for example, by setting enCutoff to true and/or by reducing the cutoff index or indices (such that more high frequency coefficients will be cutoff). Similarly, after the encoding of a current slice, if the accumulated number of bits for encoding slices of a frame up to and including the current slice exceeds a maximum bit size, then the cutoff-related parameters may be adjusted accordingly to reduce the bit rate for the next slice of the frame, for example, by setting enCutoff to true and/or by reducing the cutoff index or indices. The reverse may be implemented (e.g., disabling enCutoff and/or increasing cutoff index or indices) when the bit rate for the next slice or frame need to be increased.

If it is determined at block 308 that the certain high frequency coefficients should be cutoff, then at block 310, those coefficients are replaced with zeros or otherwise marked so as not to be encoded in the output. As discussed in further detail in FIG. 9, in some embodiments, the frequency coefficients may be arranged in such a way so as to optimize the removal of high frequency coefficients. For instance, rows of coefficients can be arranged from top to bottom, where each row corresponds to a block of the slice. The coefficients in each row (block) are arranged from left to right with the low frequency coefficients towards the left and high frequency coefficients towards the right. In such an arrangement, removal of high frequency coefficient above a certain cutoff index simply involves removing certain columns of coefficients. In some embodiments, blocks 308-310 may be optional and the high frequency coefficients are not removed.

At block 312, the remaining coefficients are entropy encoded. The coefficients in a quantized block may be scanned in a predetermined order and encoded using any suitable coding technique. The scanning order may be a zigzag pattern from the low frequency coefficients, where non-zero coefficients are likely concentrated, to high frequency coefficients, where zero or near-zero coefficients are likely located. Such a scanning order may maximize the probability of achieving long runs of consecutive zero coefficients. The scanned coefficients can then be encoded using run-length coding, variable-length encoding (e.g., Huffman coding, arithmetic coding), differential coding, Exponential-Golomb coding, Rice-Golomb coding, or any other suitable coding techniques. In some embodiments, different types of coefficients are encoded using different coding techniques. For example, the DC coefficient may be encoded using differential coding and the AC coefficients may be encoded using run-length coding. As another example, Exponential-Golomb coding may be used for small code numbers and Rice-Golomb coding may be used for large code numbers.

At block 314, the coding parameters may be adjusted based on the encoding of the current slice. The coding parameters that are adjusted can include various running statistics that are updated to account for the encoding of the current slice. For example, a cumulative total or average of bits used to encode the slices in the current frame up to the current slice can be updated with the number of bits used to encode the current slice. A running total of the maximum bits allowed to encode the slices in the current frame up to the current slice can be incremented by the maximum number of bits allowed to encode the current slice. A running total and/or average of quantization indices for all the slices in the current frame can be updated to account for the quantization index used to encode the current slice. A counter indicating a number of times when the quantization indices of encoded slices within the current frame have reached, exceeded, or falls below a predefined maximum or minimum index may be updated to account for the quantization index of the current slice.

The coding parameters may be adjusted so as to control the bit rate of the next slice in the same frame, or for the next frame if the current slice is the last slice in the frame. For example, the quantization index for the next slice may be determined based at least in part on the encoding of the current slice. For instance, the quantization index for the current slice may be adjusted to derive the quantization index for the next slice. The adjustment to the current quantization index may be determined based at least in part on a difference between a cumulative number of bits used to encode one or more slices of the current frame up to and including the current slice and a maximum number of bits allowed to encode the one or more slices of the frame. For example, when the cumulative number of bits exceeds the maximum number of bits, then a positive adjustment may be applied to the current quantization index to obtain a higher quantization index that is to be used for encoding the next slice so as to reduce the number of bits (bit size) used to encode the next slice; and vice versa.

The adjustment to the previous quantization index may be limited or otherwise modified by one or more thresholds such as an upper bound (maximum quantization index) or a lower bound (minimum quantization index). A limit for the quantization index (e.g., maximum quantization index, or minimum quantization index) may be determined based at least in part on a relationship between the given limit and the quantization indices for encoded slices in the frame including the current slice. For example, the maximum quantization index may be increased to allow larger quantization indices for subsequent slices (allowing lower bit rate) when the maximum quantization index is reached or exceeded by the current quantization index. The maximum quantization index may be kept the same or reduced if the current quantization index does not reach the maximum quantization index. As another example, a minimum quantization index may be decreased to allow smaller quantization indices for subsequent slices (allowing higher bit rate) when the current quantization index reaches or falls below the minimum quantization index. The minimum quantization index may be kept the same or increased if the current quantization index does not reach or fall below the minimum quantization index.

To avoid rapid changes in quantization indices, which would in turn affect the quality of the constructed data, the quantization index limits may be changed in a gradual or delayed manner. Instead of shifting a limit upward or downward in immediate response to the current quantization index reaching or exceeding the limit, the limit may be updated only when the limit has been repeatedly reached or exceeded. This ensures the stability of quantization index within a configurable window. The size of the window may correspond to a threshold value of a counter that tracks the number of times the quantization indices for encoded slices reached or exceeded a given quantization index limit (e.g., a maximum or minimum). The limit may be updated only when the count reaches or exceeds a given threshold. In various embodiments, the counter may track consecutive or non-consecutive reaching or exceeding of the limit.

In some embodiments, the adjustment to a quantization index limit may be determined based at least in part on the difference between a cumulative number of bits used to encode one or more slices of a frame up to and including the previous slice and a maximum number of bits allowed to encode the one or more slices of the frame. For example, when the cumulative number of bits exceeds the maximum number of bits, then a maximum quantization index may be increased to allow a higher quantization index so as to reduce the number of bits (bit size) used to encode the current slice and future slices; and vice versa. Other coding parameters, such as cutoff-related parameters, may also be updated for the next slice depending on the encoding of the current slice. Exemplary methods for adjusting coding parameters are discussed in further detail in FIGS. 4-8.

At block 316, it is determined whether there is a next slice to be encoded in the current frame. If yes, then the process 300 proceeds to block 304, for determining the coding parameters to start encoding the next slice according to the coding parameters determined in block 314. If it is determined that there is no more slice to be encoded in the current frame, then the process 300 proceeds to block 318 for determining whether there is a next frame to be encoded in the input data.

If there is a next frame to be encoded, then the process 300 proceeds to block 302, for determining frame coding parameters for the next frame. In some embodiments, frame level encoding statistics may be updated. For example, a total number of bits used to encode the current frame or an accumulative number of bits used to encode the frames up to and including the current frame may be updated. The number of bits may be compared with a maximum bit size, a minimum bit size, and/or a target bit size, and the coding parameters may be adjusted accordingly in block 302 to control bit rate. Depending on the comparison, one or more coding parameters may be updated to control bit rate. Such coding parameters may include cutoff-related parameters, quantization indices, and the like.

If it is determined that no more frames remain to be encoded, then the process 300 ends at block 320. In some embodiments, block 302 and/or block 314 may be optional and the coding parameters may be the same across different frames or slices.

According to an aspect of the present disclosure, bit rate can be controlled by updating coding parameters as data units (e.g., slices) are encoded. In some embodiments, a difference is determined between a cumulative number of bits used to encode and the maximum number of bits allowed to encode slices of a frame up to and including a first slice of a frame. The first slice is encoded using a first coding parameter. A coding parameter threshold for the first coding parameter can be updated based on an indicator that indicates a relationship between a coding parameter threshold and the coding parameters used to encode the slices up to and including the first slice. The relationship indicator can include a counter that tracks the number of times a given coding parameter threshold such as an upper or lower bound (e.g., a maximum quantization index, a minimum quantization index, or a target quantization index) has been reached or exceeded by the coding parameters (e.g., quantization indices) used to encode (e.g., quantize) the slices. A second coding parameter used to encode a second slice of a frame can be determined based on the difference and the updated coding parameter threshold.

Figure 4:
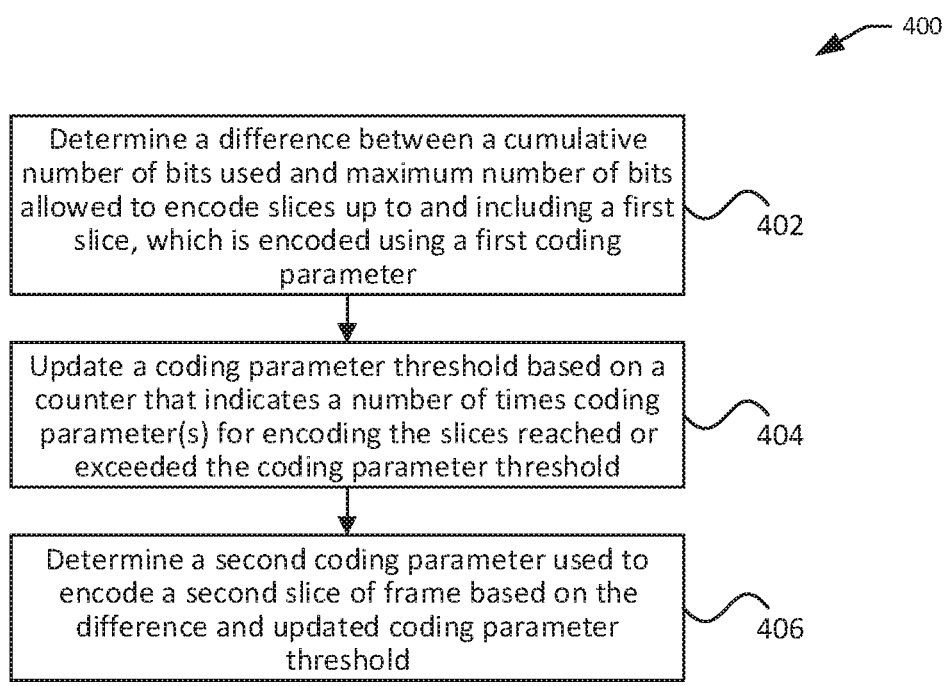
FIG. 4 illustrates an example process for controlling bit rate, in accordance with embodiments.

FIG. 4 illustrates an example process 400 for controlling bit rate, in accordance with embodiments. In some embodiments, the process 400 may be used to implement block 314 of FIG. 3 above. Aspects of the process 400 may be implemented by a rate controller such as discussed in FIG. 1.

At block 402, a difference is determined between a cumulative number of bits (accumulative bit size) used to encode one or more slices of a frame and a maximum number of bits (maximum bit size) allowed to encode the one or more slices. Each of the one or more slices of the frame is encoded using at least one coding parameter such as a quantization index. The one or more encoded slices includes a first slice, which is encoded using a first coding parameter (e.g., a first quantization index). The first slice may be the most recently encoded slice. As illustrated in FIG. 2, each slice may comprise a plurality of macroblocks. Each macroblock may comprise a plurality of blocks. Each block may comprise a plurality of pixels.

At block 404, a coding parameter threshold is updated based at least in part on a counter that indicates a number of times coding parameters for the previous slices reached or exceeded the coding parameter threshold. In an embodiment, the counter tracks a number of time quantization indices used to respectively encode (e.g., quantize) the one or more slices (including the first slice). The counter may be configured to track consecutive or non-consecutive occurrences. The coding parameter threshold may represent an upper bound or a lower bound for the slices (including the first slice) that are encoded since the coding parameter threshold was last set. For instance, if the first slice is slice 6 and the current coding parameter threshold was set after the encoding of slice 3, then the coding parameter threshold is applicable to limiting the coding parameters for slice 4, slice 5, and slice 6. The counter may be refreshed to zero after the setting of a new coding parameter threshold. In some embodiments, the coding parameters may be quantization indices and the coding parameter threshold may be a maximum quantization index or a minimum quantization index that is used to limit the quantization indices.

The coding parameter threshold may be incremented or decremented by a predefined value based on the relationship between the counter and a predefined counter threshold. For instance, when the coding parameter threshold represents an upper bound for a quantization index, the upper bound may be incremented by a predefined value (e.g., 2) when the counter is equal to or greater than a predefined counter threshold (e.g., 10). On the other hand, upper bound may remain the same or be decremented by a predefined amount when the counter is less than or equal to a predefined counter threshold (e.g., 0, 10, 20). As another example, when the coding parameter threshold represents a lower bound for a quantization index, the lower bound may be decremented by a predefined value when the counter is equal or greater than a predefined counter threshold.

Additionally or alternatively, the coding parameter threshold may be updated based at least in part on the difference (calculated in block 402) between a cumulative number of bits (accumulative bit size) used to encode one or more slices of a frame and a maximum number of bits (maximum bit size) allowed to encode the one or more slices. For instance, when the difference exceeds a certain predefined bits threshold, then the coding parameter threshold representing an upper bound may be incremented. Otherwise, the coding parameter threshold may be decremented or kept the same if the difference is less than or equal to a predefined bits threshold. The bits threshold may be a constant or may be calculated based on a variable value. For instance, the bits threshold may be calculated as a ratio of the maximum number of bits allowed.

At block 406, a second coding parameter used to encode a second slice of the frame is determined based at least in part on the difference between the cumulative number of bits used to encode the one or more slices of a frame and a maximum number of bits allowed to encode the one or more slices (determined in block 402) and the updated coding parameter threshold (determined in block 404). The second slice may be the next slice to be encoded following the first slice in the same frame for the first slice or in a different frame. Determining the second coding parameter can comprise determining an expected adjustment to the first coding parameter based at least in part on the difference. Next, the second coding parameter can be determined based on the expected adjustment and the updated coding parameter threshold. For instance, if the expected adjustment is positive and the updated coding parameter threshold is a maximum threshold, then the second coding parameter may be the minimum of (1) the result of applying the expected adjustment to the first coding parameter; and (2) the maximum threshold. On the other hand, if the expected adjustment is negative and the updated coding parameter is a minimum threshold, then the second coding parameter may be the maximum of (1) the result of applying the expected adjustment to the first coding parameter; and (2) the minimum threshold. In other words, the absolute value of the actual adjustment to first coding parameter may be less than the absolute value of the expected adjustment because it may be limited by the coding parameter thresholds. The second coding parameter may be then used to encode the second slice of the frame.

Figure 5:
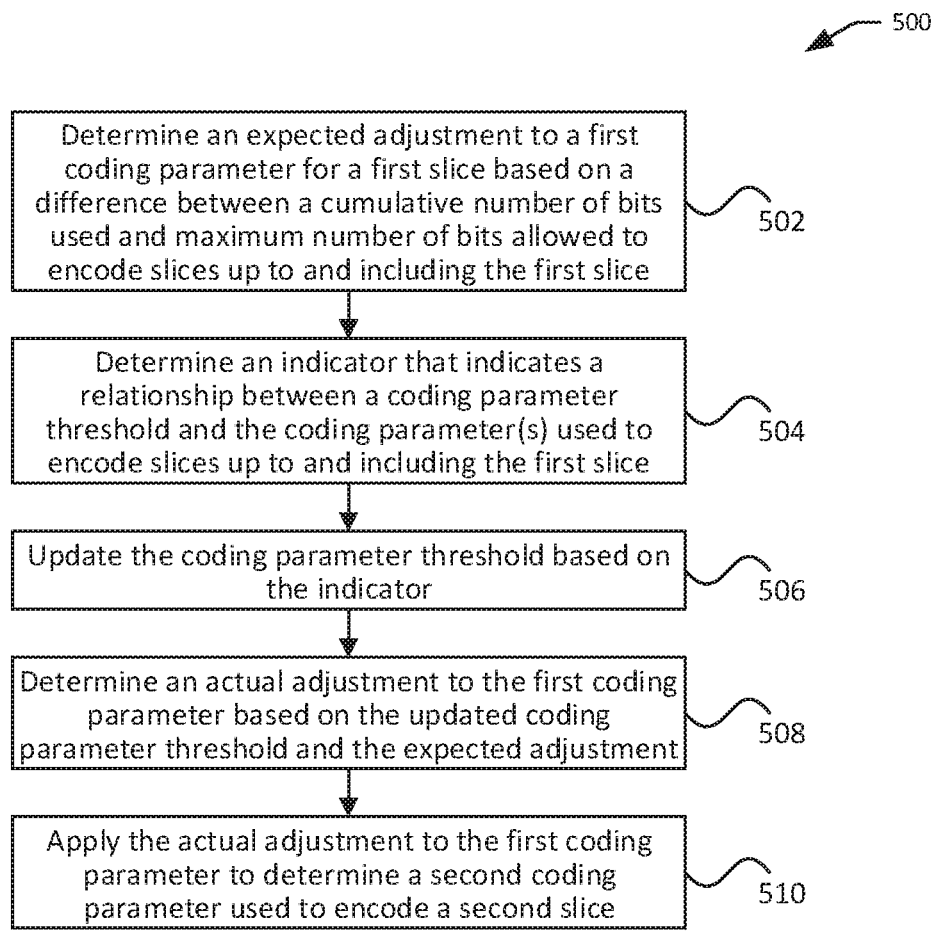
FIG. 5 illustrates an exemplary process for controlling bit rate, in accordance with embodiments.

FIG. 5 illustrates an exemplary process 500 for controlling bit rate, in accordance with embodiments. In some embodiments, the process 500 may be used to implement block 314 of FIG. 3 above. Aspects of the process 500 may be implemented by a rate controller such as discussed in FIG. 1.

At block 502, an expected adjustment to a first coding parameter of a first slice of a frame is determined based at least in a part on a difference between a cumulative number of bits used to encode one or more slices up to and including the first slice and a maximum number of bits used to encode the slices. The difference may be determined according to block 402 of process 400 described above. The first coding parameter may be used to encode the first slice, such as a quantization index used to quantize the first slice. The expected adjustment to the first coding parameter may be positive when the cumulative number of bits is greater than the maximum number allowed. The expected adjustment to the first coding parameter may be zero or negative when the cumulative number of bits is equal to or less than the maximum number allowed. In some embodiments, the larger the difference is, the larger the expected adjustment is; and vice versa. Alternatively or additionally, the expected adjustment can be determined based on a comparison of the cumulative bit size with a target or minimum bit size. For example, the expected adjustment may be positive when the cumulative number of bits is greater than the target bit size.

At block 504, an indicator is determined that indicates a relationship between a coding parameter threshold and the one or more coding parameters used encode respective slices of a frame up to and including the first slice. The coding parameter threshold may represent an upper bound, a lower bound, or a target threshold. In some embodiments, the relationship indicator can include a counter that tracks the number of times a given coding parameter threshold such as an upper or lower bound (e.g., a maximum quantization index, a minimum quantization index, or a target quantization index) has been reached or exceeded by the coding parameters (e.g., quantization indices) used to encode (e.g., quantize) the slices. In an alternative example, the counter may track the number of times the coding parameters fall within a certain range above or below the given coding parameter threshold. The counter may track only consecutive (more than one) occurrences of reaching or exceeding the coding parameter threshold. Alternatively, the counter or ratio may track non-consecutive occurrences of reaching or exceeding the coding parameter threshold. In another example, the relationship indicator may include a ratio or a percentage, instead of a counter, of the coding parameters that reached or exceeded the given coding parameter threshold.

At block 506, the coding parameter threshold may be updated based at least in part on the relationship indicator determined in block 504. In some embodiments, if relationship indicator indicates that the coding parameter threshold is too high or too low for previous coding parameters, then the coding parameter threshold may be updated accordingly. For example, the coding parameter threshold may be incremented or decremented by a predefined value based on a comparison between the relationship indicator and a predefined counter threshold. Additionally, the coding parameter may be determined based on the difference between the cumulative number of bits used to encode the slices and the maximum number of bits allowed to encode the slices, such as discussed in block 404 of process 400.

At block 508, an actual adjustment to the first coding parameter is determined based at least in part on the updated coding parameter threshold and the expected adjustment. In general, the actual adjustment may have the same sign as the expected adjustment but the absolute value of the actual adjustment may be equal or less than the absolute value of the expected adjustment. The absolute value of the actual adjustment may be determined by modifying the absolute value of the expected adjustment such that when the actual adjustment is applied to the first coding parameter, the result does not exceed the updated coding parameter threshold. For example, if the first coding parameter, the expected adjustment and the updated maximum threshold are 5, 4, and 8, then the result of applying the expected adjustment to the first coding parameter is 9, which is greater than the maximum threshold 8. Therefore, the actual adjustment may be set to 3, less than the expected adjustment 4, so that the result of applying the actual adjustment to the first coding parameter is 8, which is equal or less than the maximum threshold 8. On the other hand, if the result of the expected adjustment and the first coding parameter does not exceed the updated coding parameter threshold (e.g., if the expected adjustment is 3 or less), then the actual adjustment may be set to be the same as the expected adjustment.

At block 510, the actual adjustment is applied to the first coding parameter to determine the second coding parameter used to encode a second slice. The second slice may be the next slice to encode after the first slice. The second slice may be in the same frame as the first slice. Alternatively, the second slice may be in a different frame than the first slice. The second coding parameter may be a quantization index used to quantize the second slice.

According to aspects of the present disclosure, the coding parameters such as quantization indices are updated in a gradual and delayed fashion to prevents rapid fluctuation in the values of the coding parameters (e.g., quantization index) to compensate for relatively minor changes in encoding results and to ensure that, during a configurable window, the coding parameters and/or the quality of the reconstructed data (e.g., PSNR) are kept relatively stable. On the other hand, the techniques discussed herein allow flexible and precise control over bit rate by allowing update of the coding parameters under conditions that indicate a real need for change (e.g., when the quantization indices repeatedly hit a maximum quantization index threshold and/or when the cumulative bits difference is huge).

Figure 6:
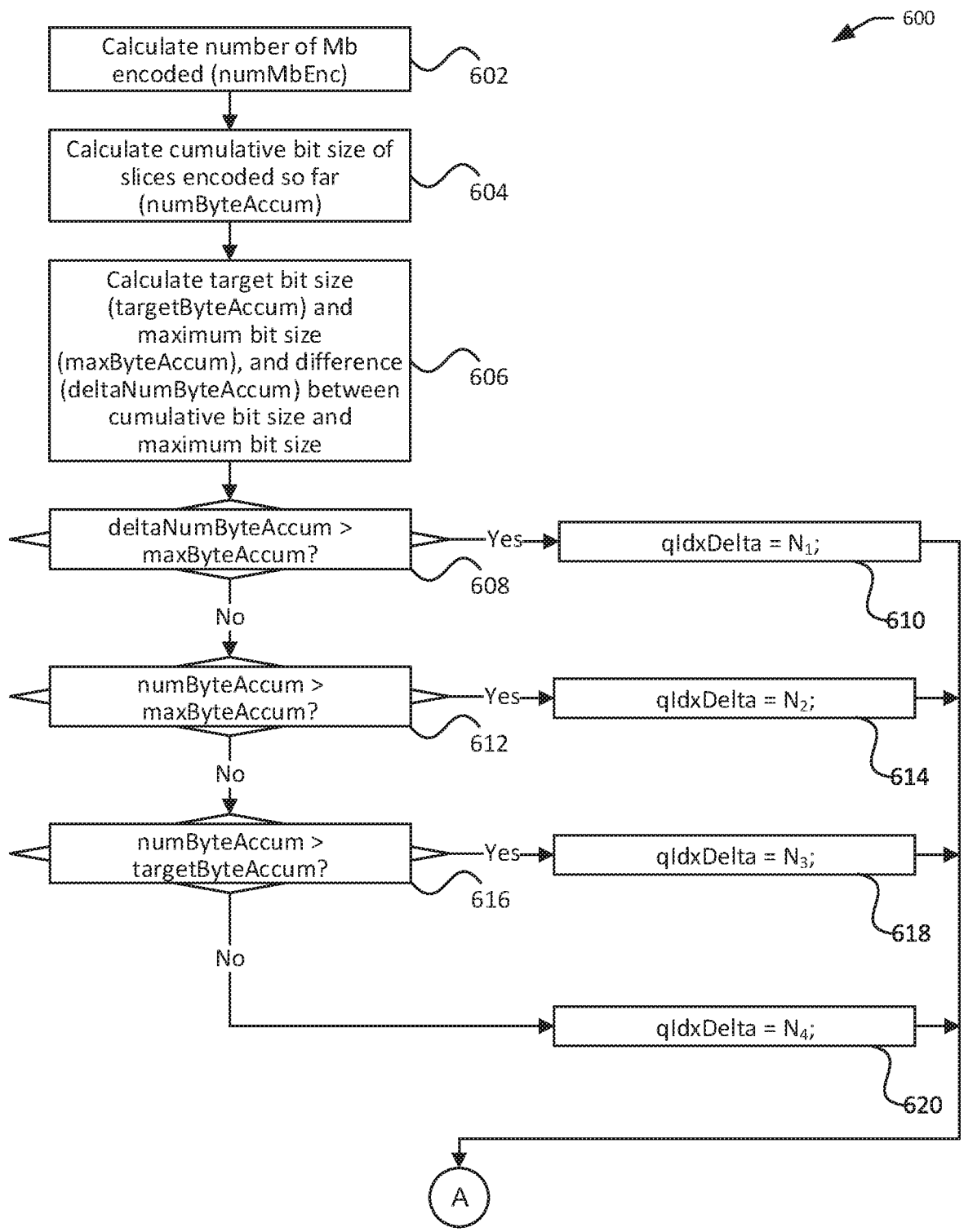
FIG. 6 illustrates, in part, an exemplary process for determining coding parameters for a slice, in accordance with embodiments.
Figure 7:
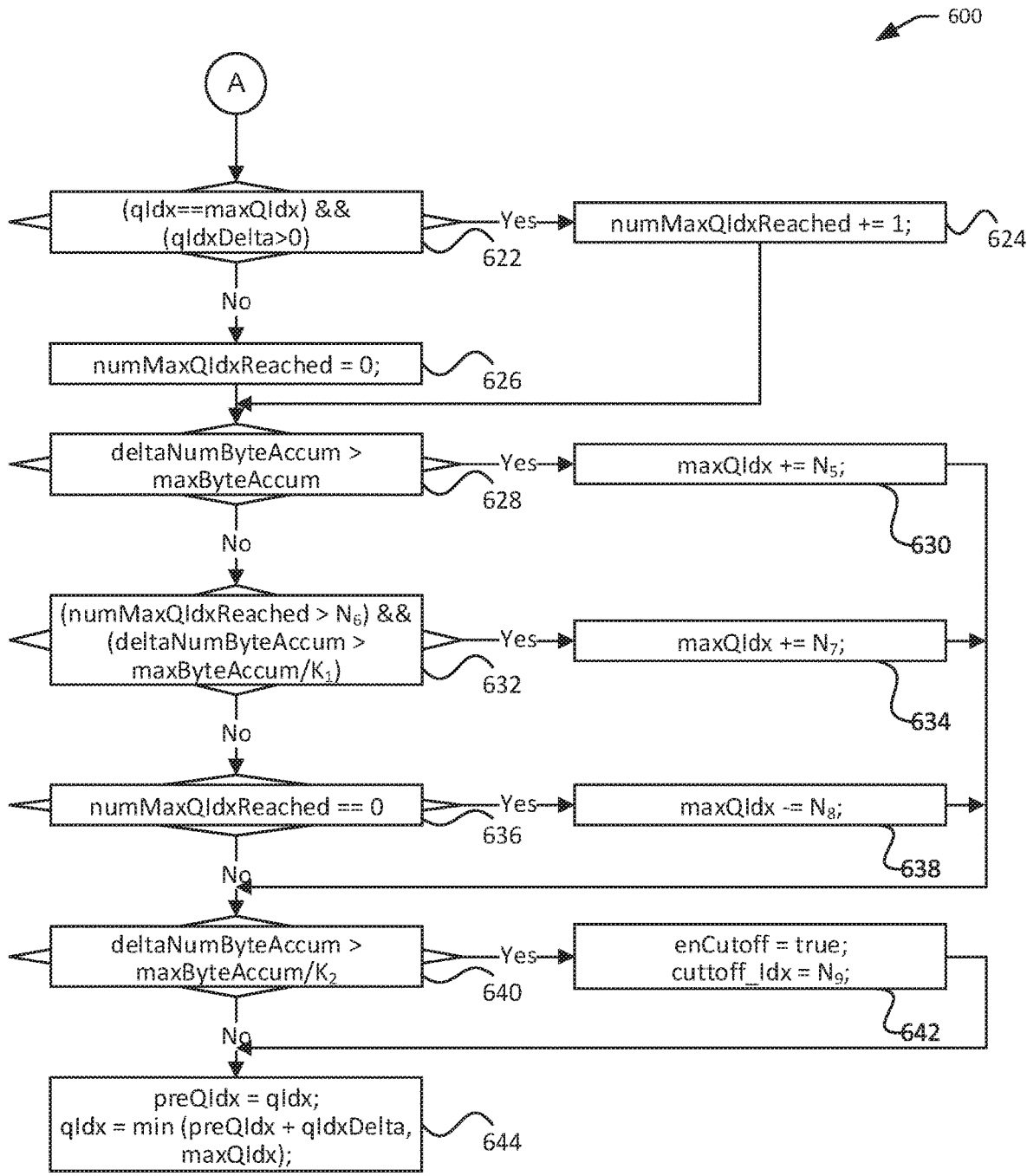
FIG. 7 illustrates, in part, an exemplary process for determining coding parameters for a slice, in accordance with embodiments.

FIGS. 6-7 illustrate an exemplary process 600 for determining coding parameters for a next slice after and based on the encoding of a current slice, in accordance with embodiments. In particular, the process 600 can be used to determine a quantization index (qIdx) and a cutoff-related parameter (enCutoff) for the next slice. In some embodiments, the process 600 may be used to implement aspects of the process 300 (e.g., block 314), process 400, or process 500 discussed above. Aspects of the process 600 may be implemented by some or all components of the system 100 discussed in FIG. 1.

FIG. 6 illustrates, in part, exemplary steps for determining an expected adjustment (qIdxDelta) to a quantization index based on comparison of a cumulative number of bits (numByteAccum) used to encode the slices up to and including a current slice with one or more coding parameter thresholds such as a maximum bit size (maxByteAccum) and/or a target bit size (targetByteAccum).

At block 602, a number of macroblocks encoded (numMbEnc) can be calculated. The numMbEnc may represent a number of macroblocks in a current frame that has been encoded so far, up to and including those in the current slice. In an example, the variable numMbEnc can be incremented with the number of macroblocks in the current slice (sliceMbCount):

numMbEnc+=sliceMbCount;

At block 604, the cumulative bit size of the slices (numByteAccum) encoded so far can be calculated. In an example, the variable numByteAccum can be incremented with the number of bits used to encode the current slice (realBytesCurSlice):

numByteAccum+=realBytesCurSlice;

At block 606, a cumulative target bit size (targetByteAccum), a cumulative maximum bit size (maxByteAccum), and a difference between the cumulative bit size and the maximum bit size (deltaNumByteAccum) are calculated. For example, the targetByteAccum and the maxByteAccum may be calculated by multiplying the number of macroblocks encoded (as calculated at block 602) with the target bit size per macroblock (targetSizePerMb) and the maximum bit size per macroblock (maxSizePerMb), respectively:

targetBypteAccum=targetSizePerMb*numMbEnc;

maxByteAccum=maxSizePerMb*numMbEnc;

The targetSizePerMb and maxSizePerMb may be predefined or calculated based on the target per frame or slice, and maximum bit size per frame or slice, respectively. For instance, if the maximum bit size per frame is 12000 bytes, there are 100 slices in a frame, and there are 10 macroblocks per slice, then the maximum bit size per slice and the maximum bit size per macroblock is 12000/100=120 bytes, and 120/10=12 bytes, respectively. Similarly, if the target bit size per frame is 10000 bytes, then the target bit size per slice and the target bit size per macroblock is 10000/100=100 bytes, and 100/10=10 bytes, respectively.

Additionally, the difference (deltaNumByteAccum) between the cumulative bit size of the encoded slices and the maximum bit size allowed can be calculated:

deltaNumByteAccum=numByteAccum−maxByteAccum;

For example, if three slices of a frame have been encoded so far using 95, 110, and 127 bytes, respectively, then the cumulative encoded bit size numByteAccum is 95+110+127=332 bytes. The cumulative target bit size targetBypteAccum is 100*3=300 bytes, and the cumulative maximum bit size maxByteAccum is 120*3=360 bytes. And the difference deltaNumByteAccum between the cumulative encoded bit size and the maximum bit size is 332−360=−28 bytes.

At blocks 608-620, an expected adjustment to the quantization index of the next slice (qIdxDelta) is calculated using the above-calculated values. In generally, when the encoding of the current slice causes the cumulative size to exceed a given threshold (e.g., maxByteAccum or targetByteAccum), then the quantization index for next slice is expected to increase (i.e., with a positive expected adjustment) in order to reduce the bit size for encoding the next slice in order to control the overall bit size; and vice versa.

At block 608, it is determined whether the difference deltaNumByteAccum is greater than the maxByteAccum. If deltaNumByteAccum>maxByteAccum, meaning that numByteAccum is greater than twice the maxByteAccum, then qIdxDelta is set to a predefined value $N_1$ at block 610, where $N_1$ is a positive number (e.g., a positive integer such as 10). In other words, the quantization index for the next slice is expected to increment by $N_1$, relative to the current quantization index. It is understood that the comparison between deltaNumByteAccum and maxByteAccum above is provided for illustrative purposes only. In some other embodiments, deltaNumByteAccum may be compared with Z×maxByteAccum, where Z may be any positive number other than one (e.g., 1.5, 2, 2.5).

Otherwise, it is determined at block 612 whether numByteAccum is greater than maxByteAccum. If yes, meaning that numByteAccum is greater than maxByteAccum but less than twice the maxByteAccum, then qIdxDelta is set to another predefined value $N_2$ at block 614, where $N_2$ is a positive number (e.g., a positive integer such as 3). In other words, the quantization index for the next slice is expected to increment by $N_1$, relative to the current quantization index.

If it is determined at block 612 that nmByteAccume<=maxByteAccum, then at block 616, it is determined whether numByteAccum is greater than targetByteAccum. If numByteAccum>targetByteAccum, then qIdxDelta is set to another predefined value $N_3$ at block 614, where $N_3$ is a positive number (e.g., a positive integer such as 1). In other words, the quantization index for the next slice is expected to increment by $N_3$, relative to the current quantization index. In some embodiments, the greater the difference between numByteAccum and maxByteAccum or targetByteAccum, the larger the value for qIdxDelta. Thus, for instance, $N_1$ may be greater than $N_2$, which is greater than $N_1$. In some other embodiments, $N_1$ may not be greater than $N_2$, and $N_2$ may not be greater than $N_3$.

If it is determined at block 616 that numByteAccum<=targetByteAccum, then at block 620, qIdxDelta is set to another predefined value $N_4$ at block 620, where $N_4$ is a negative number (e.g., a negative integer such as −2). In other words, the quantization index for the next slice is expected to decrease by $|N_4|$, relative to the current quantization index.

In some embodiments, only one of maxByteAccum and targetByteAccum is calculated and used to compare with numByteAccum so as to determine qIdxDelta. In some other embodiments, the numByteAccum may be compared with additional threshold values such as a minimum cumulative bit size (minByteAccum). For instance, if numByteAccum is less than minByteAccum, the quantization index for the next slice may be decremented (qIdxDelta<0) so as to increase the overall bit rate.

Continuing with process 600, FIG. 7 illustrates exemplary steps for determining coding parameters for the next slice using at least some of the values calculated in the blocks in FIG. 6. For instance, a quantization index for the next slice is determined. Optionally, cutoff-related parameters can also be calculated for the next slice.

At blocks 622-626, a counter (numMaxQIdxReached) is calculated that indicates a number of times quantization indices used to encode the slices of the frame have consecutively reached or exceeded a given maximum quantization index (maxQIdx). Additionally, the counter may indicate the number of times when the cumulative bit size for the encoded slices exceeds a maximum cumulative bit size or a target cumulative bit size. At block 622, it is determined whether (1) the quantization index for the current (already encoded) slice (qIdx) is equal to maxQIdx and (2) the expected adjustment of quantization index is positive. As discussed above, the expected adjustment is typically positive when the cumulative bit size for the encoded data exceeds a maximum cumulative bit size or a target cumulative bit size. If yes, then the counter numMaxQIdxReached is incremented by a predefined amount such as one at block 624. Otherwise, if condition (1) or condition (2) is false, then the counter numMaxQIdxReached is set to zero at block 626. In some alternative embodiments, only one of conditions (1) and (2) may be tested in block 622.

At blocks 628-638, the maximum threshold for quantization indices (maxQIdx) is determined based on the current maxQIdx. For example, the new maxQIdx may be derived by incrementing or decrementing the old maxQIdx by a predetermined amount depending on various conditions. The maximum threshold may be raised to allow higher quantization index to be used for future slices so as to decrease the overall bit rate. This increase in the maximum threshold may be necessary if the cumulative bit size of the encoded slices (including the previous slice) is too high (e.g., exceeding a maximum or target bit size). On the other hand, the maximum threshold may be decreased to reduce the higher quantization index to be used for future slices so as to increase the overall bit rate in order to achieve higher quality of the reconstructed data (e.g., PSNR). This decrease in the maximum threshold may be desirable when the cumulative bit size of the encoded slices (including the previous slice) is low enough (e.g., below a maximum or target bit size). When adjustment is unnecessary (e.g., when the bit rate does not need to be adjusted), the new maxQIdx may be set to be the same as the old maxQIdx.

At block 628, it is determined whether the bits difference (deltaNumByteAccum) between the cumulative bit size of the encoded slices (numByteAccum) and the maximum cumulative bit size (maxByteAccum) is greater than the maximum cumulative bit size (maxByteAccum). If deltaNumByteAccum>maxByteAccum, meaning that numByteAccum is greater than twice the maxByteAccum, then maxQIdx is incremented by a predefined value $N_5$ at block 630, where $N_5$ is a positive number (e.g., a positive integer such as 10).

Otherwise, it is determined at block 632 whether (1) the counter (numMaxQIdxReached) determined at blocks 624 or 626 is greater than a predefined counter threshold $N_6$, where $N_6$ is a positive number (e.g., a positive integer such as 5, also referred to as maxQIdxReachedNum elsewhere herein); and (2) the bits difference (deltaNumByteAccum) is greater than a threshold value such as a constant or a predetermined ratio of the maximum cumulative bit size (e.g., maxByteAccum/$K_1$, where is $K_1$ is a positive integer such as 16). If yes, then maxQIdx is incremented by a predefined value $N_7$ at block 634, where $N_7$ is a positive number (e.g., a positive integer such as 2). In some embodiments, the greater the difference between numByteAccum and maxByteAccum, the more maxQIdx is incremented, and thus $N_5$ is greater than $N_7$. In some other embodiments, $N_5$ may be less or equal to $N_7$. The conditions (1) and (2) in block 632 above ensure that, absent extreme cases such when the condition in block 628 is true, the value of maxQIdx is updated in a gradual fashion. For example, if either (1) or (2) is false, then the maxQIdx remains unchanged.

If it is determined at block 632 that num-MaxQIdxReached is less or equal to $N_6$, or if deltaNumByteAccum is no more than maxByteAccum/$K_1$, then at block 636, it is determined whether num-MaxQIdxReached is equal to zero. If yes, then maxQIdx is decremented by a predefined value $N_8$ at block 638, where $N_8$ is a positive number (e.g., a positive integer such as 2).

Next, cutoff related parameters may be optionally determined by comparing the bits difference (deltaNumByteAccum) with a predefined bits threshold such as a constant or a predetermined ratio of the maximum cumulative bit size (e.g., maxByteAccum/$K_2$, where is $K_2$ is a positive integer such as 8). If deltaNumByteAccum is greater than the bits threshold (e.g., maxByteAccum/$K_2$), then cutoff is enabled to remove high frequency coefficients of the next slice to be encoded, so as to reduce overall bit rate. For instance, a flag (enCutoff) indicating whether cutoff is enabled may be set to true and a cutoff index (cutoff_idx) may be set to a predefined value $N_9$ at block 642, where $N_9$ is a positive integer (e.g., 60) that is less or equal to the number of pixels in a macroblock or any quantization unit (e.g., 64). Optionally, the value of the cutoff index $N_9$ may be determined based on the encoding of the current and/or previous slice. In some cases, the larger the bits difference (deltaNumByteAccum), the more high frequency coefficients would be cutoff so as to conserve bits for encoding previous slices, and hence the lower the cutoff index. The smaller the bits difference (deltaNumByteAccum), the less high frequency coefficients would need to be cutoff and hence the higher the cutoff index. In some embodiments, more than one cutoff indices may be determined for different type of data to be encoded (e.g., cutoff_idxL for luma data, and cutoff_idxC for chroma data). In some embodiments, some or all of the cutoff-related parameters may not be updated after the encoding of each slice. Rather, they may be updated after the encoding of each frame.

In some embodiments, the predefined bits threshold may vary depending on an order in which the current slice or the next slice is encoded relative to the other slices of the frame. For instance, predefined bits threshold may increase or decrease so as to make it more difficult or easier to cutoff high frequency coefficients as more slices are encoded.

At block 644, the quantization index for the next slice to be encoded is determined. The quantization index of the next slice may be obtained by taking the minimum of (1) the sum of the quantization index of the current slice (preQIdx) and the expected adjustment to it (qIdxDelta); and (2) the maximum quantization index threshold (maxQIdx) calculated above. In some embodiments, the quantization index of the next slice may be limited by other threshold values such as a minimum quantization index threshold. For example, the quantization index of the next slice may be the maximum of (1) the sum of the quantization index of the current slice and the expected adjustment; and (2) the minimum quantization index threshold. The minimum quantization index threshold may be updated in a similar fashion as described herein for the maximum quantization index threshold. For example, a counter may be used to keep track of the number of time when the quantization indices reach or fall below the minimum quantization index threshold. If the counter exceeds a certain counter threshold and/or the cumulative bit size is less than a target or minimum cumulative bit size, then the minimum quantization index threshold may be decreased.

In various embodiments, some or all of the various predefined values used above (e.g., $N_1$-$N_9$, $K_1$ and $K_2$) may remain constant or vary for difference slices depending on an order in which the current or the next slice is encoded relative to other slices in the frame. For instance, $K_1$ (in block 632) and/or $K_2$ (in block 640) may increase for later encoded slices than for the earlier encoded slices, so that maxByteAccum/$K_1$ and/or maxByteAccum/$K_2$ remain relatively unchanged as maxByteAccum increases for later encoded slices. The expected adjustment qIdxDelta (e.g., $N_1$, $N_2$, $N_3$, and/or $N_4$ from blocks 610, 614, 618, and 620) may increase or decrease for later encoded slices. The adjustment to maxQIdx (e.g., $N_5$, $N_7$, and/or $N_8$ blocks 630, 634, and 638) may increase or decrease for later encoded slices. The counter threshold $N_5$ in block 632 may increase or decrease so as to increase or decrease the size of the window within which the maxQIdx will likely remain the same. The size of the window can also be increased or decreased by increasing or decreasing the value of maxByteAccum/$K_1$, as discussed above. Additionally, the cutoff-related parameters may be determined based on an encoding order of the slices. For example, the threshold for enabling cutoff, maxByteAccum/$K_2$ in block 640 may increase as maxByteAccum increase (e.g., by keeping $K_2$ constant, decreasing $K_2$ or increasing $K_2$ at rate slower than the increase of maxByteAccum), so as to make it more difficult to enable cutoff for later slices than for earlier slices. Conversely, the value of maxByteAccum/$K_2$ in block 640 may decrease as maxByteAccum increase (e.g., by increasing $K_2$ at a rate faster than the increase of maxByteAccum), so as to make it easier to enable cutoff for later slices than for earlier slices. The cutoff index $N_9$ block 642 may increase or decrease for later encoded slices so as to increase or decrease bit rate for later encoded data.

Figure 8:
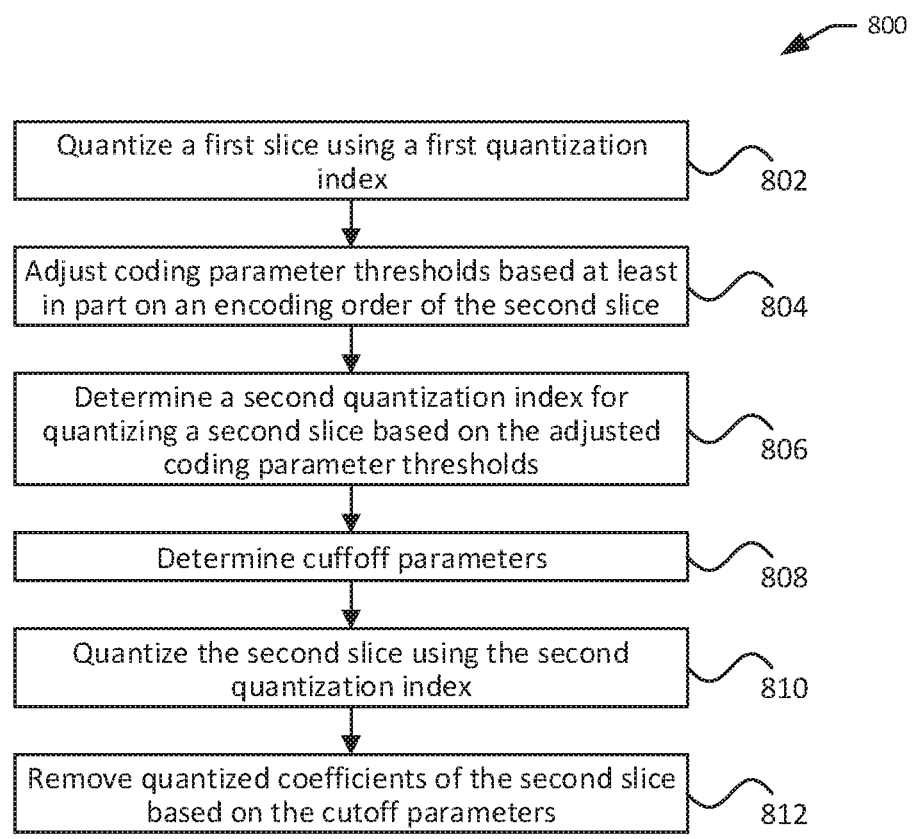
FIG. 8 illustrates an exemplary process for encoding data with rate control, in accordance with embodiments.

FIG. 8 illustrates an exemplary process 800 for encoding data with rate control, in accordance with embodiments. Aspects of the process 800 may be implemented by components of the system 100 discussed in FIG. 1.

At block 802, a first slice of a frame is quantized using a first quantization index.

At block 804, one or more coding parameter thresholds may be adjusted based at least in part on an encoding order of the second slice that is to be encoded after the first slice. The coding parameter thresholds may include any predefined and configurable values (e.g., $N_1$-$N_9$, $K_1$ and $K_2$ in process 600 of FIGS. 6-7) that may be used in determining coding parameters for the second slice. The coding parameter thresholds may also include the maximum quantization index threshold discussed herein (e.g., maxQIdx in process 600). The coding parameter thresholds may increase, decrease or remain the same depending on an encoding order of the second slice relative to other slices of the frame. For instance, the coding parameter thresholds may be different when the second slice is part of the first half or first quarter of slices of the frame that are encoded than when the second slice is part of the last half or last quarter of the slices that are encoded. For a given slice (e.g., the second slice), some of the thresholds may increase, while others may remain unchanged or decrease.

At block 806, a second quantization index for quantizing the second slice is determined based at least in part on the adjusted one or more coding parameter, such as described in FIGS. 3-7. The determination of the second quantization index can also be based at least in part on the encoding results of the first slice, as described herein.

At block 808, one or more cutoff parameters are determined. The cutoff parameters may be determined based at least in part on the coding parameter thresholds (e.g., $K_2$ and $N_9$ in FIG. 7). In some embodiments, block 808 may be optional.

At block 810, the second slice is quantized using the second quantization index determined in block 806.

At block 812, the high frequency coefficients of the resulting quantized coefficients of the second slice are then removed using the cutoff parameters determined in block 808.

Figure 9:
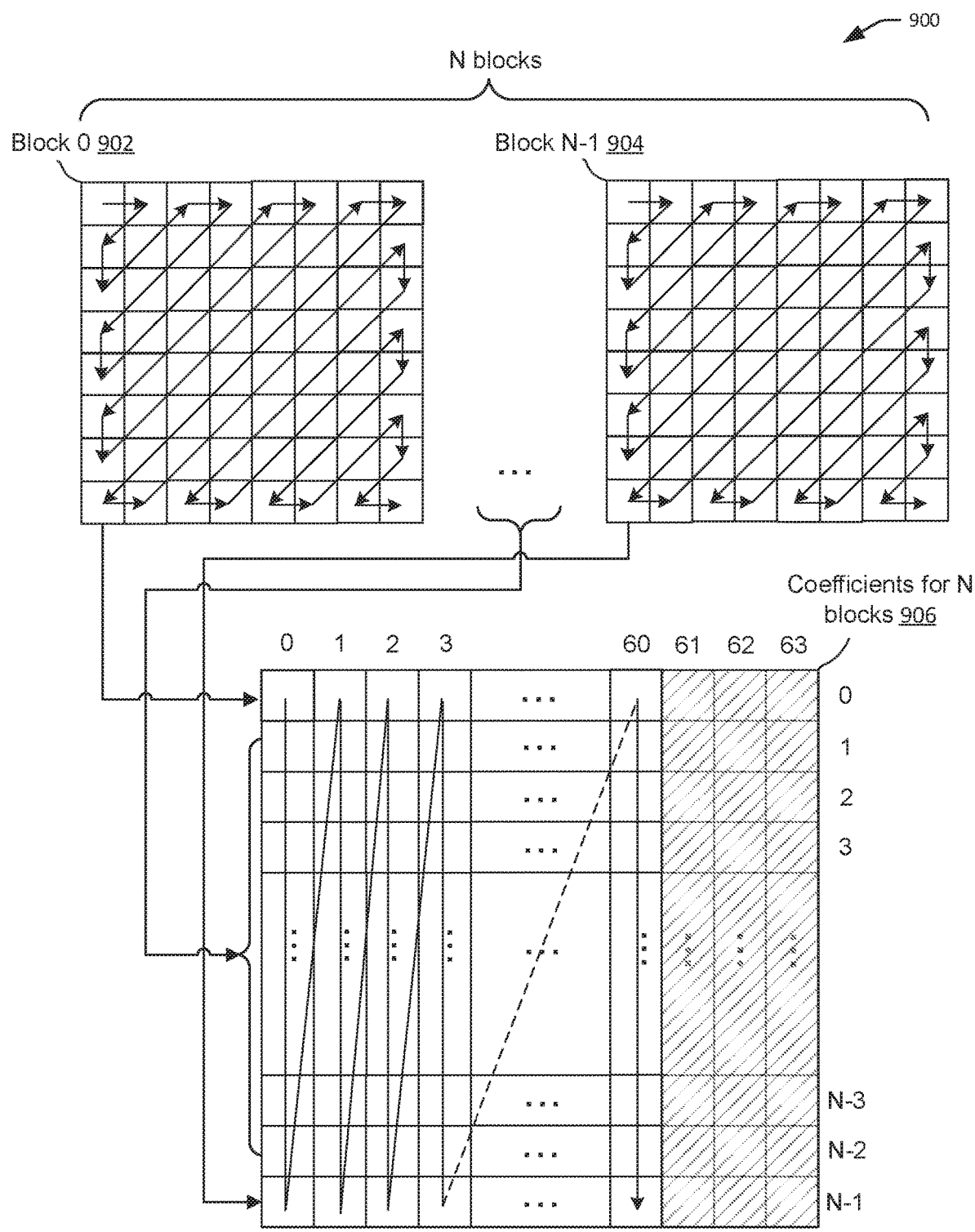
FIG. 9 illustrates an exemplary process for removing high frequency coefficients of a slice, in accordance with embodiments.

FIG. 9 illustrates an exemplary process 900 for removing high frequency coefficients of a slice, in accordance with embodiments. In particular, the coefficients of a slice may be arranged in a particular manner so as to facilitate efficient removal of certain high frequency coefficients. As discussed herein, cutting off or removing a coefficient means replacing the coefficient with zero or otherwise marking the coefficient such that the coefficient is not encoded in the output.

In the illustrate example, a slice comprises N blocks and each block comprises 8×8 pixels. Each block of the slice has been quantized (e.g., using a quantization index provided by a rate controller), resulting in an 8×8 block of coefficients. Exemplary blocks of coefficients include block 0 902 and block N-1 904. For each block, its 64 coefficients can be arranged according to their frequencies in an ascending order (i.e., from low frequency to high frequency). In some embodiments, the low frequency coefficients are concentrated toward the upper left corner of a block and the high frequency coefficients are concentrated toward the lower right of the block. Accordingly, the coefficients of a block may be scanned in a zigzag pattern from the upper left corner to the lower right corner as illustrated in block 0 902 and block N-1 904. The scan results in a list of the coefficients of the block in an ascending order of frequencies. In alternative embodiments, the coefficients of a block may be scanned in some other pattern such as a raster scan pattern.

The ordered coefficients of N blocks of the slice may be arranged in a table 906. The table has N rows, each row corresponding to a block of the slice. Thus, row 0 comprises coefficients of block 0, row 1 comprises coefficients of block 1, and so on. Row N-1 comprises coefficients of block N-1. The coefficients in each row in ascending order of frequencies. Thus, each column of the table comprises coefficients of a particular index in the ordered list of coefficients. For instance, column 0 includes lowest frequency coefficients across all N blocks, column 1 includes the next lowest frequency coefficients across all N blocks, and so on. Column 63 includes the highest frequency coefficients across all N blocks.

Such arrangement of the block coefficients as described herein facilitate efficient implementation of the removal of certain high frequency coefficients across the blocks. To remove or cut off high frequency coefficients above a certain frequency index, cutoff_idx, one can simply remove all the columns to the left of column cutoff_idx. For instance, if cutoff_idx is 60, then columns 61-63 (illustrated in FIG. 9 as shaded area) can removed as a whole. Such removal of whole columns of the table may be more efficient to implement than removing high efficient coefficients from individual blocks. In some embodiments, the removal of the high frequency coefficients may be implemented efficiently using parallel processing or hardware acceleration techniques.

Furthermore, the arrangement of block coefficients as described herein can facilitate efficient entropy encoding of the remaining coefficients. For instance, the coefficients can be scanned in the pattern as illustrated in the table 906, from top to bottom and from left to right. Thus, coefficients in column 0 are scanned from top to bottom before coefficients in column 1 are scanned and so on. Accordingly, the lower frequency coefficients across the blocks of the slice are scanned before the higher frequency coefficients of the blocks. Such a scanning order may maximize the probability of achieving long runs of consecutive zero coefficients. The scanned coefficients can then be encoded using run-length coding, variable-length encoding (e.g., Huffman coding, arithmetic coding), differential coding, Exponential-Golomb coding, Rice-Golumb, or any other suitable coding techniques.

The systems, devices, and methods of the present disclosure provide techniques for controlling bit rate of encoded video or other types of data. In particular, the techniques can be used to keep the bit rate per frame around or below a given maximum bit size or bit rate by adjusting coding parameters after encoding each slice of a frame. Such coding parameters may include, for example, a quantization index used to quantize the next slice and a cutoff index used to remove certain high frequency coefficients of the next slice. Advantageously, the rate control techniques described herein can be control the bit rate of the encoded data in a single pass, without first preprocessing the input data, thereby saving the time and computing resources required for the encoding process. The coding parameters and the bit rate may be adjusted in a gradual fashion, without significantly affecting the quality of the reconstructed data. In addition, the coding parameters may be adjusted adaptively based on an encoding order of the slices.

Figure 10:
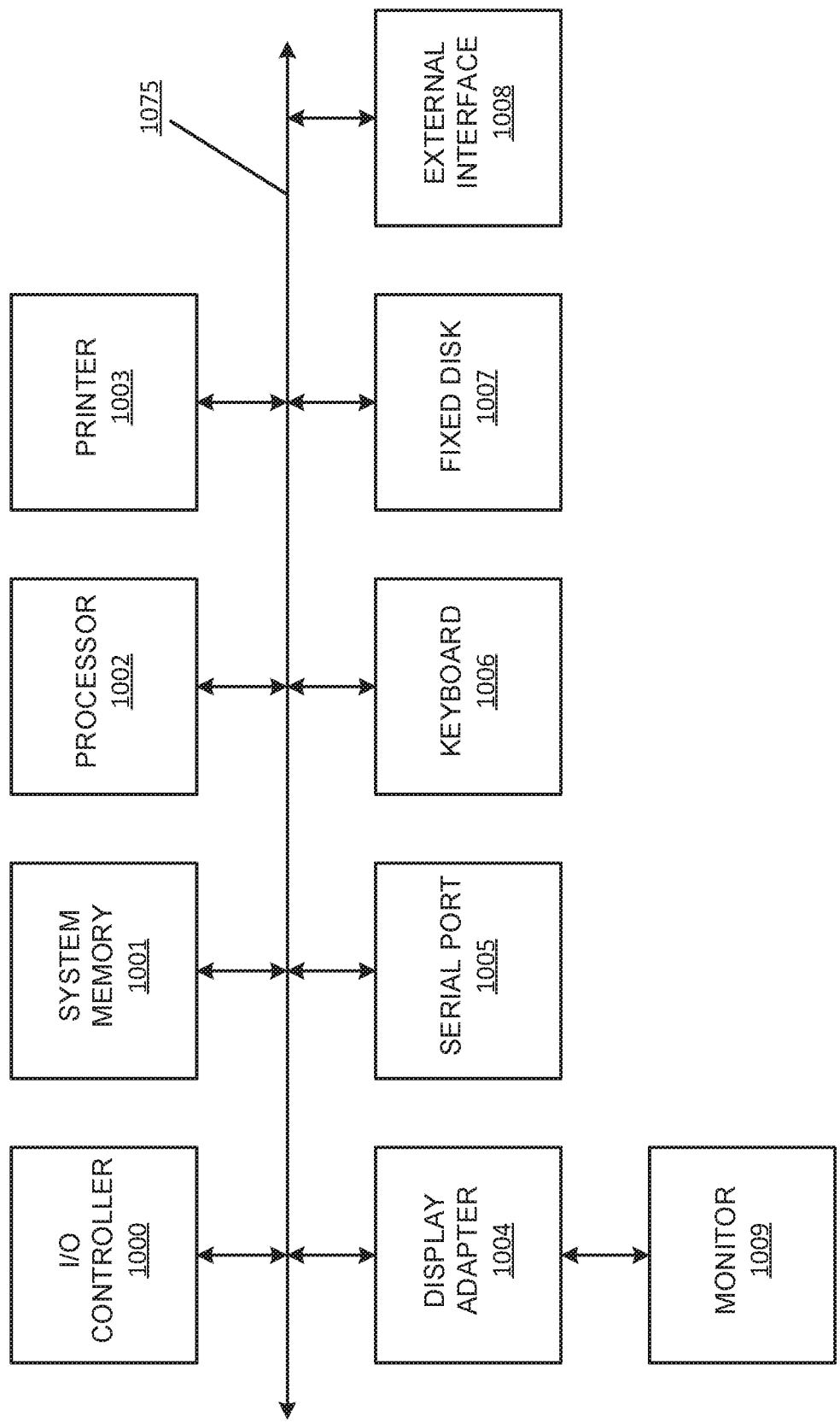
FIG. 10 shows a high level block diagram of a computer system that may be used to implement any of the entities or components described above.

FIG. 10 shows a high level block diagram of a computer system that may be used to implement any of the entities or components described above. The subsystems shown in FIG. 10 are interconnected via a system bus 1075. Additional subsystems include a printer 1003, keyboard 1006, fixed disk 1007, and monitor 1009, which is coupled to display adapter 1004. Peripherals and input/output (I/O) devices, which couple to I/O controller 1000, can be connected to the computer system by any number of means known in the art, such as a serial port. For example, serial port 1005 or external interface 1008 can be used to connect the computer apparatus to a wide area network such as the Internet, a mouse input device, or a scanner. The interconnection via system bus 1075 allows the processor 1002 to communicate with each subsystem and to control the execution of instructions from system memory 1001 or the fixed disk 1007, as well as the exchange of information between subsystems. The system memory 1001 and/or the fixed disk may embody a computer-readable medium.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The above description is illustrative and is not restrictive. Many variations of the disclosure may become apparent to those skilled in the art upon review of the disclosure. The scope of the invention may, therefore, be determined not with reference to the above description, but instead may be determined with reference to the pending claims along with their full scope or equivalents.

It should be understood that any of the embodiments of the present disclosure can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the disclosure. However, other embodiments of the disclosure may be directed to specific embodiments relating to each individual aspect, or specific combinations of these individual aspects.

The above description of example embodiments of the disclosure has been presented for the purposes of illustration and description. It is not intended to be exhaustive or to limit the disclosure to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary.

What is claimed is:

1. A computer-implemented method for controlling bit rate, comprising:
   determining a difference between a cumulative number of bits used to encode one or more slices of a frame up to and including a first slice and a maximum number of bits allowed to encode the one or more slices of the frame, the first slice being encoded using a first coding parameter;
   updating a coding parameter threshold based at least in part on a counter that indicates a number of times when one or more coding parameters used to encode the one or more slices reach or exceed the coding parameter threshold; and
   determining a second coding parameter used to encode a second slice of the frame distinct from the one or more slices of the frame based at least in part on the difference and the updated coding parameter threshold.

2. The method of claim 1, wherein each of the one or more slices of the frame is encoded using a corresponding one of the one or more coding parameters.

3. The method of claim 1, wherein the first coding parameter and the second coding parameter are quantization parameters.

4. The method of claim 1, further comprising determining an expected adjustment to the first coding parameter based at least in part on the difference.

5. The method of claim 4, wherein determining the second coding parameter comprises determining an actual adjustment to the first coding parameter based at least in part on the expected adjustment.

6. The method of claim 4, wherein the expected adjustment to the first coding parameter is positive when the cumulative number of bits is greater than the maximum number of bits allowed.

7. The method of claim 4, wherein the expected adjustment to the first coding parameter is zero or negative when the cumulative number of bits is equal to or less than the maximum number of bits allowed.

8. The method of claim 1, wherein the counter indicates a number of consecutive times when the one or more coding parameters reach or exceed the coding parameter threshold.

9. The method of claim 1, wherein the coding parameter threshold represents an upper bound for the first coding parameter and the updated coding parameter threshold represents an upper bound for the second coding parameter.

10. The method of claim 1, wherein updating the coding parameter threshold comprises incrementing the coding parameter threshold by a predefined value if the counter is equal to or greater than a predefined counter threshold and the difference between the cumulative number of bits and the maximum number of bits exceeds a predefined bits threshold.

11. The method of claim 10, wherein the predefined value varies depending on an order in which the first slice or the second slice is encoded relative to other slices of the frame.

12. The method of claim 10, wherein the predefined bits threshold varies depending on an order in which the first slice or the second slice is encoded relative to other slices of the frame.

13. The method of claim 1, wherein updating the coding parameter threshold comprises decrementing the coding parameter threshold by a predefined value if the counter is less than a predefined counter threshold or if the difference between the cumulative number of bits and the maximum number of bits does not exceed a predefined bits threshold.

14. The method of claim 13, wherein the predefined value varies depending on an order in which the first slice or the second slice is encoded relative to other slices of the frame.

15. The method of claim 13, wherein the predefined bits threshold varies depending on an order in which the first slice or the second slice is encoded relative to other slices of the frame.

16. The method of claim 1, further comprising removing a predefined set of frequency coefficients for the second slice of the frame based at least in part on the difference.

17. The method of claim 16, wherein the predefined set is determined based at least in part on a determination that the difference exceeds a predefined bits threshold.

18. The method of claim 17, wherein the predefined bits threshold varies depending on an order in which the first slice or the second slice is encoded relative to other slices of the frame.

19. One or more non-transitory computer-readable storage media storing computer-executable instructions that, when executed by a computing system, configure the computing system to perform operations comprising:
   determining a difference between a cumulative number of bits used to encode one or more slices of a frame up to and including a first slice and a maximum number of bits allowed to encode the one or more slices of the frame, the first slice being encoded using a first coding parameter;
   updating a coding parameter threshold based at least in part on a counter that indicates a number of times when one or more coding parameters used to encode the one or more slices reach or exceed the coding parameter threshold; and
   determining a second coding parameter used to encode a second slice of the frame distinct from the one or more slices of the frame based at least in part on the difference and the updated coding parameter threshold.

20. A computer system, comprising:
   a memory that stores one or more computer-executable instructions; and
   one or more processors configured to access the memory and execute the computer-executable instructions to perform operations comprising:
      determining a difference between a cumulative number of bits used to encode one or more slices of a frame up to and including a first slice and a maximum number of bits allowed to encode the one or more slices of the frame, the first slice being encoded using a first coding parameter;
      updating a coding parameter threshold based at least in part on a counter that indicates a number of times when one or more coding parameters used to encode the one or more slices reach or exceed the coding parameter threshold; and
      determining a second coding parameter used to encode a second slice of the frame distinct from the one or more slices of the frame based at least in part on the difference and the updated coding parameter threshold.

21. The method of claim 1, further comprising:
   determining a third coding parameter used to encode a slice of a different frame based at least in part on the difference and the updated coding parameter threshold.

* * * * *